United States Patent
Hoshino

(10) Patent No.: US 12,013,849 B2
(45) Date of Patent: Jun. 18, 2024

(54) QUESTION RESPONDING APPARATUS, QUESTION RESPONDING METHOD, AND RECORDING MEDIUM

(71) Applicant: NEC Corporation, Tokyo (JP)

(72) Inventor: Ayako Hoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 712 days.

(21) Appl. No.: 16/973,581

(22) PCT Filed: Jun. 14, 2018

(86) PCT No.: PCT/JP2018/022712
§ 371 (c)(1),
(2) Date: Dec. 9, 2020

(87) PCT Pub. No.: WO2019/239543
PCT Pub. Date: Dec. 19, 2019

(65) Prior Publication Data
US 2021/0248140 A1 Aug. 12, 2021

(51) Int. Cl.
*G06F 16/2452* (2019.01)
*G06F 16/248* (2019.01)
*G06F 16/28* (2019.01)
*G06F 40/30* (2020.01)

(52) U.S. Cl.
CPC ...... *G06F 16/24522* (2019.01); *G06F 16/248* (2019.01); *G06F 16/282* (2019.01); *G06F 16/287* (2019.01); *G06F 40/30* (2020.01)

(58) Field of Classification Search
CPC ....... G06F 16/00; G06F 16/248; G06F 16/282
See application file for complete search history.

(56) References Cited

U.S. PATENT DOCUMENTS

| | | | | |
|---|---|---|---|---|
| 6,208,987 B1* | 3/2001 | Nihei | .................. | G06F 16/2423 |
| | | | | 707/999.005 |
| 6,470,337 B1* | 10/2002 | Nihei | .................. | G06F 16/2425 |
| | | | | 707/999.005 |
| 2008/0147437 A1* | 6/2008 | Doud | ..................... | G16H 10/20 |
| | | | | 715/811 |

(Continued)

FOREIGN PATENT DOCUMENTS

| | | | |
|---|---|---|---|
| JP | 2001-249685 A | 9/2001 | |
| JP | 2003-228575 A | 8/2003 | |

(Continued)

OTHER PUBLICATIONS

International Search Report for PCT Application No. PCT/JP2018/022712, dated Aug. 28, 2018.

(Continued)

*Primary Examiner* — Samuel G Neway

(57) ABSTRACT

A question responding apparatus is provided with a type determination unit that determines, on the basis of a question from a user, the type of answer to the question; a path selection unit that selects one path among paths from a current position node selected from among nodes in a hierarchical structure of information to matching nodes that match the type of answer; and a choices processing unit that presents information that indicates a node included in the selected path to the user as a choice.

8 Claims, 21 Drawing Sheets

(56) References Cited

U.S. PATENT DOCUMENTS

| | | | | |
|---|---|---|---|---|
| 2013/0144899 A1* | 6/2013 | Lee | ................... | G06F 16/24575 |
| | | | | 707/759 |
| 2015/0293917 A1* | 10/2015 | Bufe, III | ........... | G06F 16/24575 |
| | | | | 706/12 |
| 2016/0307283 A1* | 10/2016 | Melzer | ................... | G06Q 50/18 |
| 2017/0031931 A1* | 2/2017 | Linda | ................... | G06F 16/285 |
| 2017/0372190 A1* | 12/2017 | Bishop | ................... | G06F 16/00 |
| 2019/0220524 A1* | 7/2019 | Costabello | ........ | G06F 16/24578 |
| 2021/0248140 A1* | 8/2021 | Hoshino | ............... | G06F 16/287 |

FOREIGN PATENT DOCUMENTS

| | | |
|---|---|---|
| JP | 2004-118647 A | 4/2004 |
| JP | 2005-190100 A | 7/2005 |
| JP | 2006-039881 A | 2/2006 |
| JP | 2008-145769 A | 6/2008 |
| JP | 2010-086335 A | 4/2010 |
| JP | 2010-140154 A | 6/2010 |
| JP | 2015-036945 A | 2/2015 |

OTHER PUBLICATIONS

JP Office Action for JP Application No. 2020-525028, dated Sep. 6, 2022 with English Translation.

JP Office Action for JP Application No. 2020-525028, dated Mar. 7, 2023 with English Translation.

Sakata et al., "The construction of a dialog bot based on the dialog flow chart automatic generation and it from a *", administration FAQ page, 24th time of language-processing society annual meeting Announcement collected-papers[online], a language-processing society, Mar. 5, 2018, pp. 971-974, Internet<URL:http://www.anlp.jp/proceedings/annual_meeting/2018/pdf_dir/D5-4.pdf>.

* cited by examiner

FIG. 27

```
USER: I WANT TO KNOW MY NUMBER OF VACATION DAYS

SYSTEM: THERE ARE (1) SPECIAL VACATION,
(2) ANNUAL VACATION, AND (N) OTHER VACATION.
WHICH ONE ARE YOU ASKING ABOUT?

USER: (SELECTS ANNUAL VACATION)

SYSTEM: ARE YOUR YEARS OF SERVICE AS OF APRIL 1
(1) LESS THAN 5 YEARS? (2) 5 YEARS OR MORE AND
LESS THAN 15 YEARS? OR (3) 15 YEARS OR MORE?

USER: (SELECTS 5 YEARS OR MORE AND LESS THAN 15 YEARS)

SYSTEM: YOUR NUMBER OF DAYS OF ANNUAL VACATION IS 21.
```

FIG. 28

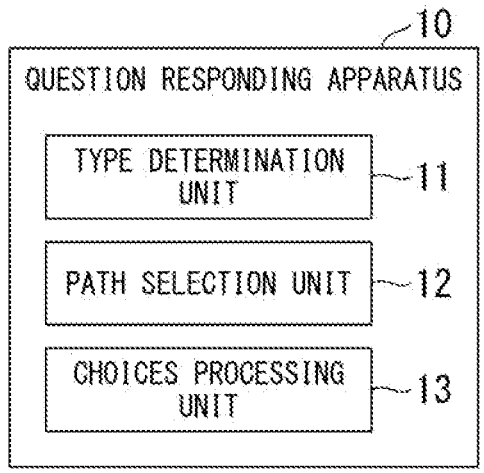

QUESTION RESPONDING APPARATUS, QUESTION RESPONDING METHOD, AND RECORDING MEDIUM

This application is a National Stage Entry of PCT/JP2018/022712 filed on Jun. 14, 2018, the contents of all of which are incorporated herein by reference, in their entirety.

TECHNICAL FIELD

The present invention relates to a question responding apparatus, a question responding method, and a recording medium.

BACKGROUND ART

In relation to information extraction from a document written in natural language, Patent Document 1 describes an interaction scenario generation system that extracts operation contents from an operation manual of a television written in natural language to generate an interactive scenario. This interactive scenario generation system stores in advance information about the format of the operation manual and rules for extracting character strings from the operation manual.

Using this information and rules, this interactive scenario generation system extracts user requests such as "turn on the TV" and operation procedures such as "press the 'power' button on the remote control" from the operation manual, to be presented to a developer of a natural language interactive system. The developer of the natural language interactive system inputs a process to be executed by the natural language interactive system in accordance with the user request and operation procedure in a format interpretable by the natural language interactive system.

PRIOR ART DOCUMENT

Patent Document

Patent Document 1: Japanese Unexamined Patent Application, First Publication No. 2008-145769

SUMMARY

Problems to be Solved by the Invention

When a question responding apparatus extracts from a document an answer to a question from a user, it may be necessary to ask the user back. For example, when the question responding apparatus is asked the number of vacation days from the user, the question responding apparatus may ask the user back about the vacation type since the number of vacation days differs depending on the vacation type.

When the question responding apparatus asks a question back to the user and extracts the answer from the document, it is preferable that the number of processes be relatively small.

On the other hand, Patent Document 1 does not describe that the apparatus asks a user back in order to extract information.

In particular, with regard to the generation of interaction scenarios, the interaction scenario generation system automatically generates interaction scenarios without asking the user a question.

Moreover, in relation to the execution of the interaction scenario, the interaction scenario includes "choices" such as "press one of the [terrestrial digital] button, [BS] button, and [CS] button], but these "choices" are for operating a machine and not for extracting information. Then, it is not assumed that the processing of the natural language interactive system that executes the interaction scenario branches in accordance with the selection from these "choices".

Therefore, Patent Document 1 does not describe how to reduce the burden on the user when the apparatus asks the user back to extract information.

An example of an object of the present invention is to provide a question responding apparatus, a question responding method, and a recording medium capable of solving the above-mentioned problems.

Means for Solving the Problems

According to a first example aspect of the present invention, a question responding apparatus is provided with a type determination unit that determines, on the basis of a question from a user, a type of answer to the question; a path selection unit that selects any one of paths from a current position node selected from among nodes in a hierarchical structure of information to matching nodes that match the type of answer; and a choices processing unit that presents information that indicates a node included in the selected path to the user as a choice.

According to a second example aspect of the present invention, the question responding method incudes a step of determining, on the basis of a question from a user, a type of answer to the question; a step of setting paths from a current position node selected from among nodes in a hierarchical structure of information to matching nodes that match the type of answer; and a step of presenting a node included in the path to the user as a choice.

According to a third example aspect of the present invention, a recording medium records a program for causing a computer to execute: a step of determining, on the basis of a question from a user, a type of answer to the question; a step of setting paths from a current position node selected from among nodes in a hierarchical structure of information to matching nodes that match the type of answer; and a step of presenting a node included in the path to the user as a choice.

Example Advantageous Effects of the Invention

With the question responding apparatus, the question responding method, and the recording medium described above, when the question responding apparatus asks the user a question and extracts the answer from the document, the question responding apparatus requires relatively little processing.

BRIEF DESCRIPTION OF THE DRAWINGS

FIG. 27 is a diagram showing an example of an interaction between a user and the question responding system according to the second example embodiment.

FIG. 28 is a diagram showing an example of the configuration of a question responding apparatus according to an example embodiment of the present invention.

EXAMPLE EMBODIMENT

Hereinbelow, example embodiments of the present invention will be described, but the following example embodiments are not intended to limit the invention defined by the claims. In addition, not all of the combinations of features described in the example embodiments are essential to the solution of the invention.

First Example Embodiment

Figure 1:
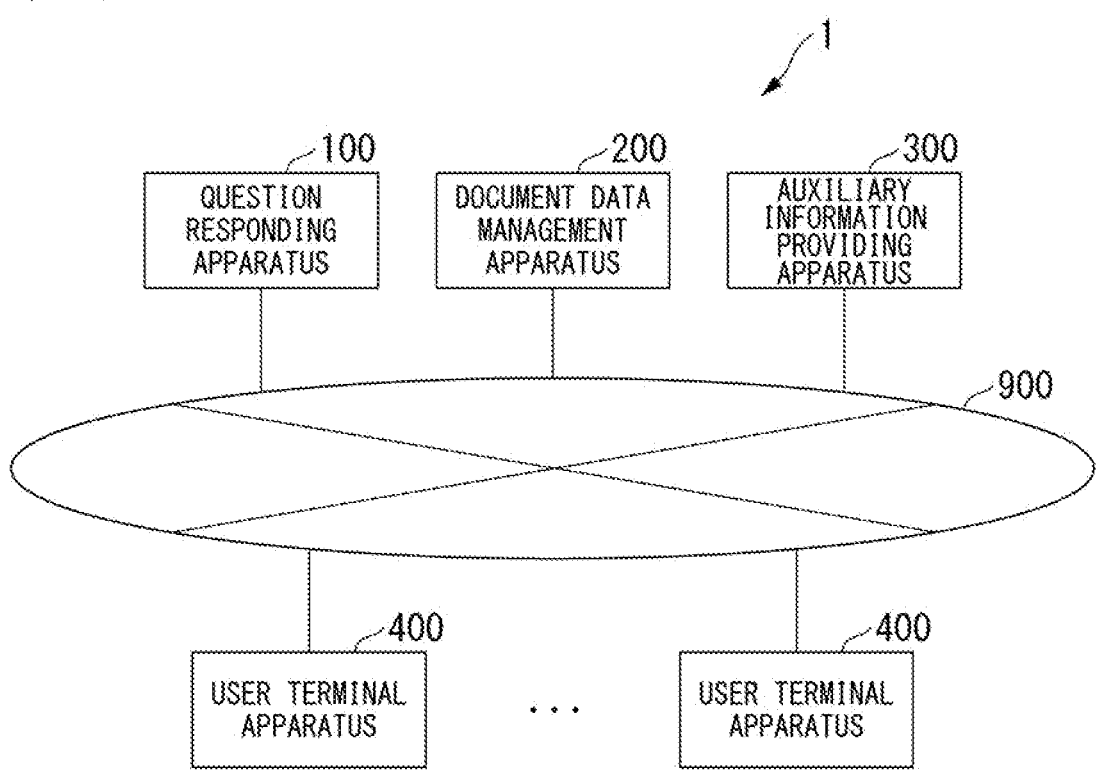
FIG. 1 is a schematic configuration diagram showing an example of the apparatus configuration of a question responding system according to a first example embodiment.

FIG. 1 is a schematic configuration diagram showing an example of the apparatus configuration of a question responding system according to a first example embodiment. With the configuration shown in FIG. 1, the question responding system 1 includes a question responding apparatus 100, a document data management apparatus 200, an auxiliary information providing apparatus 300, user terminal apparatuses 400, and a communication network 900.

The question responding system 1 is a system for answering a user's questions.

The document data management apparatus 200 stores as document data documents serving as information sources for answering a user's questions, and functions as a data server. The document data management apparatus 200 is configured using a computer such as a workstation or a personal computer (PC).

The document data management apparatus 200 stores document data from which the hierarchical structure of documents can be extracted, such as document data of structured documents or document data of semi-structured documents.

In the following, a case in which the document data management apparatus 200 stores in-house documents such as work rules as document data will be described as an example. However, the document data stored in the document data management apparatus 200 is not limited to the document data of an in-house document, with various types of document data being available, such as a document used in a system for diagnosing a system failure and a document used in education. The document data includes information regarding questions from the user. In particular, the document data includes information such as an answer to a question or candidates that may be an answer to a question. Further, the document data includes information associated with a user's question like a user query node described later. The question responding apparatus 100 traces the structure of the document data by using the information associated with the user's question, thereby obtaining the information that is the answer to the user's question from the information of the candidates for the answer, and so answers the user.

Also, in the document data, information is recorded hierarchically in upper items, lower items, and the like. As in an example described later, information represented in a tabular format such as table elements of a hypertext markup language (HTML) may also be represented in a hierarchical structure.

The document data management apparatus 200 extracts information that is the answer to the question from the user, from the document data in accordance with an operation performed by the user on the question responding apparatus 100. In other words, the document data management apparatus 200 selects, from the information indicated by the document data, information that matches the question and the operation performed by the user. That is, the user operates the question responding apparatus 100 and inputs a question in order to obtain an answer to the question from the document data. The document data management apparatus 200 selects information that matches the operation and the question performed by the user from the information indicated by the document data. As described later, the number of items of information selected by the document data management apparatus 200 from the information indicated by the document data is not limited to one, but may be multiple items.

The question responding apparatus 100 executes a process for answering a user's question. The question responding apparatus 100 is configured by using a computer such as a workstation or a personal computer.

As a pre-process for an answer, the question responding apparatus 100 extracts the hierarchical structure of the document on the basis of the inter-document relation and intra-document relation of the document data stored in the document data management apparatus 200, and renders the document data into a hierarchical structure. Hereinafter, the document data given a hierarchical structure by the question responding apparatus 100 is referred to as hierarchical structure data. The question responding apparatus 100 may store the hierarchical structure data, or an apparatus other than the question responding apparatus 100, such as the document data management apparatus 200, may store the hierarchical structure data.

In the following, a case in which the question responding apparatus 100 converts document data into tree-structured data in a hierarchical structure will be described as an example. When there are a plurality of documents to be searched for an answer, the question responding apparatus 100 generates, for example, one tree obtained by merging the trees for each document as hierarchical structure data. Various pieces of information in the documents for which an answer is searched are arranged in nodes in a tree structure generated by the question responding apparatus 100. Moreover, an edge between two nodes indicates that the information indicated by each of these two nodes is associated. For example, when there is an inclusive relation between two pieces of information, an edge is set between these two pieces of information. Alternatively, an edge is set between a node indicating certain information and a node indicating a value related to the information. The information about the node is not limited to the example described above.

However, the hierarchical structure data handled by the question responding apparatus 100 is not limited to tree-structured data, and may be data of various structures in which a partial order is defined between nodes and which has no loop. For example, the question responding apparatus 100 may handle hierarchical structure data having a directed acyclic graph structure.

Upon receiving a question from the user, the question responding apparatus 100 traces nodes in accordance with the data structure of the hierarchical structure data, reaches the node indicating an answer, and outputs the answer. When there are a plurality of candidates of the nodes to trace, the question responding apparatus 100 asks a question to the user and selects a node in accordance with the user's response. Hereinbelow, the question from a user is called a user query. A question from the question responding apparatus 100 to the user is referred to as an ask-back.

Also, the question responding apparatus 100 determines the type of answer on the basis of the question from the user. Then, the question responding apparatus 100 determines whether the information indicated by a node reachable from the current node matches the answer type. When the information indicated by the reachable node does not match the type of answer, the question responding apparatus 100 narrows down the candidates for the answer by not including the node in the candidates for the node indicating the answer.

Type as mentioned here is a condition for selecting information in a document. The type of answer as mentioned here is the type expected for the answer. A type determination unit 184 sets the type of answer on the basis of the user query.

Unit can be used as a type. For example, when the user query is an inquiry about the number of days of vacation, the type determination unit 184 sets that the unit is days, such as 1 day, 2 days, or 3 days, as the type of answer. The type of answer is called the answer type.

The auxiliary information providing apparatus 300 stores auxiliary information. When there are a plurality of candidates of the nodes that the question responding apparatus 100 traces, the auxiliary information mentioned here is information for selecting any one node of the candidates. Since the question responding apparatus 100 does not need to ask a question back by selecting a node using the auxiliary information, for example, it is possible to reduce the processing required for interactive processing with the user, in the question responding apparatus 100 as an expert system.

In the following, a case in which the question responding apparatus 100 uses information on the years of service of employees as auxiliary information will be described as an example. However, the auxiliary information used by the question responding apparatus 100 is not limited to the information on the years of service of the employees, and may be any information with which any of candidates of the nodes that the question responding apparatus 100 traces can be selected.

The user terminal apparatus 400 functions as a user interface in the question responding system 1. In particular, the user terminal apparatus 400 displays various images in accordance with the instruction of the question responding apparatus 100. In addition, the user terminal apparatus 400 receives a user operation, and transmits data indicating the user operation that was performed to the question responding apparatus 100. Hereinafter, the data indicating the user operation will be referred to as input data.

The user terminal apparatus 400 is configured using a computer such as a personal computer, a tablet terminal apparatus, or a smartphone.

The number of user terminal apparatuses 400 may be one or more.

The communication network 900 mediates communication between the question responding apparatus 100, the document data management apparatus 200, and the user terminal apparatuses 400. Various types of communication networks can be used as the communication network 900. For example, the communication network 900 may be a local area network (LAN) such as an in-house network. Alternatively, the communication network 900 may be the Internet.

Any one or more of the document data management apparatus 200, the auxiliary information providing apparatus 300, the user terminal apparatuses 400, and the communication network 900 may be configured as an external apparatus of the question responding system 1.

Moreover, any one or more of the question responding apparatus 100, the document data management apparatus 200, the auxiliary information providing apparatus 300, the user terminal apparatuses 400, and the communication network 900 may be configured as one apparatus. For example, the question responding apparatus 100 may be configured to have the function of the user terminal apparatus 400.

The auxiliary information providing apparatus 300 is not essential to the question responding system 1. If the auxiliary information providing apparatus 300 does not exist, the question responding apparatus 100 cannot use the auxiliary information. In this case, the question responding apparatus 100 can narrow down the candidates of the nodes to trace by performing an ask-back, without using the auxiliary information.

Further, when the question responding apparatus 100 directly obtains the hierarchical structure data instead of obtaining the document data, the document data management apparatus 200 is not essential to the question responding system 1.

Figure 2:
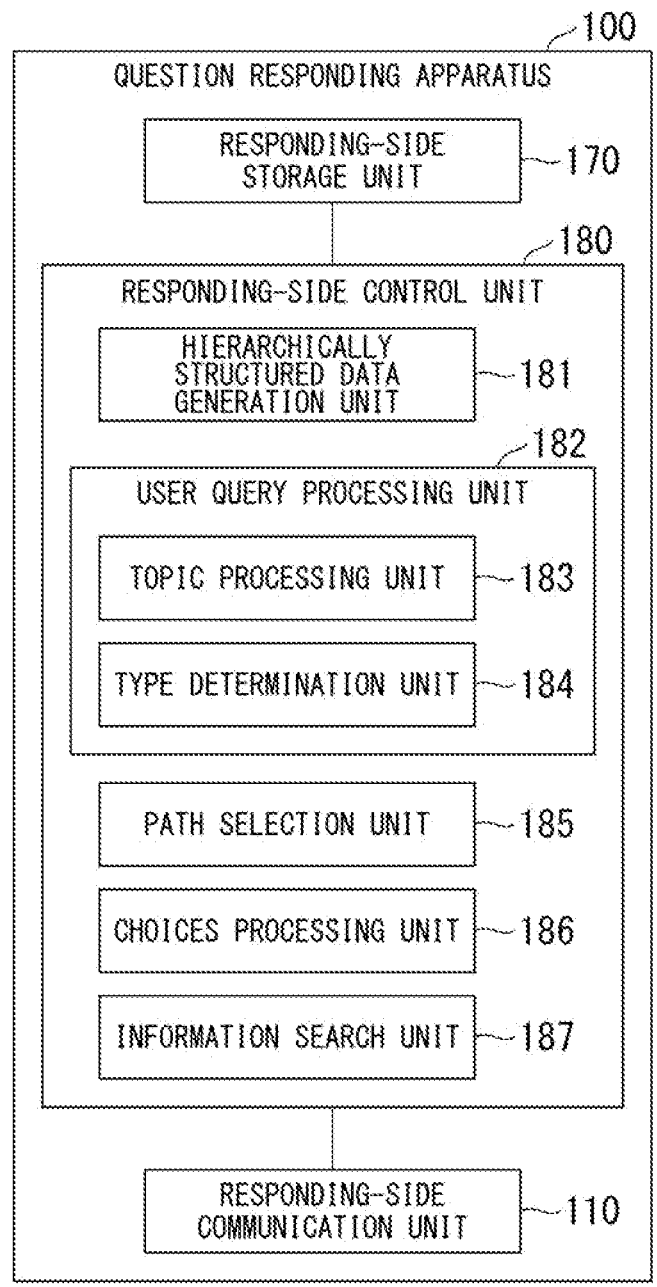
FIG. 2 is a schematic block diagram showing an example of a functional configuration of the question responding apparatus according to the first example embodiment.

FIG. 2 is a schematic block diagram showing an example of the functional configuration of the question responding apparatus 100 according to the first example embodiment. With the configuration shown in FIG. 2, the question responding apparatus 100 is provided with an answering-side communication unit 110, an answering-side storage unit 170, and an answering-side control unit 180. The answering-side control unit 180 is provided with a hierarchically structured data generation unit 181, a user query processing unit 182, a path selection unit 185, a choices processing unit 186, and an information search unit 187. The user query processing unit 182 includes a topic processing unit 183 and the type determination unit 184.

The answering-side communication unit 110 communicates with other apparatuses. In particular, the answering-side communication unit 110 receives the document data from the document data management apparatus 200. Further, the answering-side communication unit 110 transmits various data to be displayed on the user terminal apparatuses 400 to the user terminal apparatuses 400, and receives input data from the user terminal apparatuses 400. As described above, the input data is data indicating the user operations received by the user terminal apparatuses 400.

Hereinbelow, a case will be described as an example in which the answering-side communication unit 110 transmits image data to a user terminal apparatus 400 and causes the user terminal apparatus 400 to display an image under the control of the answering-side control unit 180. However, the data transmitted by the answering-side communication unit 110 to the user terminal apparatus 400 is not limited to image data. For example, the answering-side communication unit 110 may transmit data such as character strings or numerical values to the user terminal apparatus 400, and the user terminal apparatus 400 may generate image data using these data and display an image. Moreover, the answering-side communication unit 110 may transmit data about a display format to the user terminal apparatus 400 in addition to the data such as the character strings or the numerical values, and the user terminal apparatus 400 may display an image in accordance with the display format.

The answering-side storage unit 170 stores various data. For example, the answering-side storage unit 170 stores hierarchical structure data. The answering-side storage unit 170 is configured using a storage device included in the question responding apparatus 100.

The answering-side control unit 180 controls each unit of the question responding apparatus 100 to execute various processes. The answering-side control unit 180 is configured by a central processing unit (CPU) included in the question responding apparatus 100 that reads a program from the answering-side storage unit 170 and executes the program.

The hierarchically structured data generation unit 181 puts the document data described above into a hierarchical structure. The hierarchically structured data generation unit 181 can use a widely known method as the method of converting document data into a hierarchical structure. For example, when the document data is marked up in HTML, the hierarchical structure of the document may be extracted on the basis of the heading tags (h1 tag to h6 tag) in the document data. Alternatively, when the document data is marked up in a style sheet (cascading style sheets; CSS) format, the hierarchically structured data generation unit 181 may extract the hierarchical structure of the document on the basis of class attributes such as P elements and DIV elements, or the font designation.

The user query processing unit 182 processes user queries.

The topic processing unit 183 extracts a topic from the user query, detects the node most similar to the topic among the nodes of the hierarchical structure data, and sets that node as the user query node. The topic mentioned here is the subject of the question (i.e., a keyword indicating the content of the question). For example, when the user query is "How many days are vacation days?", the topic processing unit 183 extracts "vacation" as the topic.

The topic processing unit 183 may perform syntactic analysis of the user query and compare the result of the syntactic analysis with a template stored in advance to identify the topic in the user query. However, the method by which the topic processing unit 183 extracts the topic from the user query is not limited thereto, and various methods can be used.

Further, the topic processing unit 183 calculates the degree of matching between morphemes of the node and the user query for each node of the hierarchical structure data using, for example, a Jaccard coefficient. Specifically, the topic processing unit 183 calculates Expression (1) as the degree of matching between the morphemes of the node and the user query.

[Expression 1]

$$\frac{|setX \cap setY|}{|setX \cup setY|} \quad (1)$$

Here, setX denotes a collection of morphemes included in the user query. setY denotes a collection of morphemes included in the node. Also, the number of elements in the collection is indicated by $\|$. For example, the number of elements of the collection "S" is expressed as "$|S|$".

Expression (1) indicates a value obtained by dividing the number of morphemes common to the node and the user query by the number of morphemes included in at least one of the user query and the node.

However, the method by which the topic processing unit 183 calculates the degree of similarity between the user query and the node is not limited to the method using Expression (1), and various methods can be used.

The type determination unit 184 determines the type of answer to the question on the basis of the question from the user (user query). As described above, type mentioned here is a condition for selecting information in a document.

The path selection unit 185 selects one of the paths from the current position node selected among the nodes in the hierarchical structure of information (hierarchical structure data) to the matching nodes that match the answer type. Then, the path selection unit 185 reselects a path in accordance with the user's response to a presentation of the choices performed by the choices processing unit 186 asking the user back.

The path selected by the path selection unit 185 is a sequence of edges from the current node to the node that matches the answer type. Accordingly, the path selection by the path selection unit 185 corresponds to selection of the information group including the information indicated by the current node and the information matching the answer type from background knowledge (information). That is, the path selection by the path selection unit 185 corresponds to selecting knowledge information that matches the information indicated by the current node and the answer type.

The path selected by the path selection unit 185 can be regarded as a hypothesis in hypothesis reasoning (abduction). Presenting the information indicated by the node on the path to the user and receiving an answer can be regarded as verifying the hypothesis. In this case, the path selection unit 185 maintains the hypothesis when the user's answer is positive, and rebuilds a hypothesis when the answer is negative. The path selection unit 185 repeats this process until reaching a leaf, so that a correct hypothesis can be obtained and an answer desired by the user can be obtained. As will be described later, an inference engine may be used as the path selection unit 185.

Among the paths from the current position node to the matching nodes, the path selected by the path selection unit 185 is called the selected path.

The path selection unit 185 selects one path. When the user's response to the ask-back indicates that the node included in the selected path is not selected, the path selection unit 185 reselects one path other than the already-selected path as the selected path.

The current position node is a node selected from the nodes of the hierarchical structure data. In the initial setting, the path selection unit 185 sets the user query node as the current position node. When only one of the child nodes of the current position node can reach candidates for the node indicating the answer to the user query, the path selection unit 185 updates the current position node to the child node. Candidates for the node indicating the answer to the user query are nodes that are not excluded from the candidates for the node indicating the answer to the user query among the matching nodes. The path selection unit 185 makes this exclusion on the basis of the user's response to the ask-back.

As described above, a matching node is a node matching the answer type. That is, a matching node is a node that meets the condition indicated by the answer type. In the initial setting, the path selection unit 185 sets the matching node as an answer candidate node. An answer candidate node is a node set by the path selection unit 185 as the candidate for the node indicating the answer to the user query.

The path selection unit 185 may cause candidates for the node indicating the answer to the user query match the answer candidate nodes. In this case, in the initial setting, the path selection unit 185 sets all matching nodes as answer candidate nodes. Then, when any node of the answer candidate nodes is excluded from the candidates for the node indicating the answer to the user query due to the response of the user to the ask-back, the path selection unit 185 releases the setting of the answer candidate node for that node.

When a candidate for the node indicating the answer to the user query and the answer candidate node match, the path selection unit 185 can select the path from the current position node to the answer candidate node by tracing the ancestor node from the answer candidate node to reach the current position node.

Alternatively, the path selection unit 185 may set any node among candidates for the node indicating the answer to the user query as the answer candidate node.

For example, upon having traced a descendant node from the current position node to reach the matching node, the path selection unit 185 may select a path from the current position node to the node that has been reached and set the node that has been reached as the answer candidate node.

Figure 3:
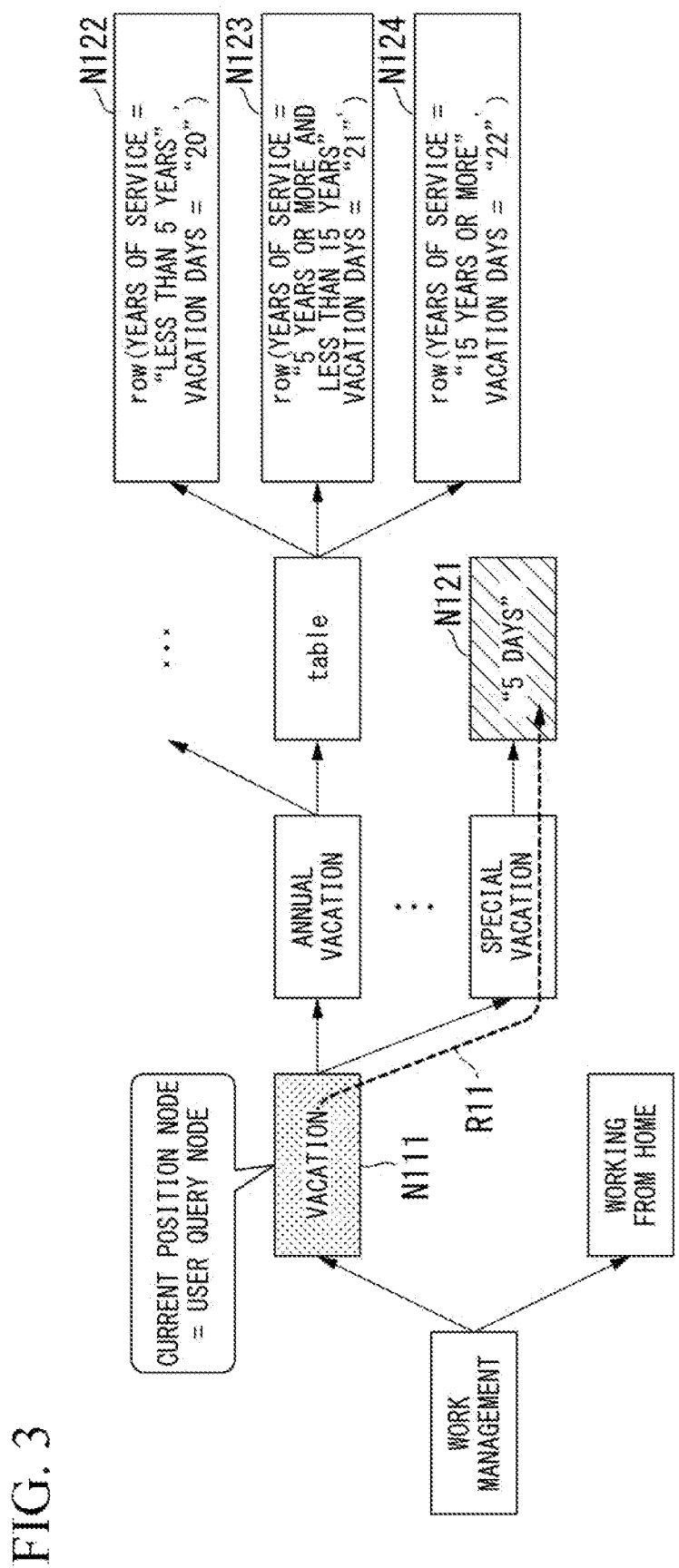
FIG. 3 is a diagram showing a first example of a current position node and answer candidate nodes according to the first example embodiment.

FIG. 3 is a diagram showing a first example of the current position node and the answer candidate node. FIG. 3 shows an example in which the hierarchical structure data is tree-structured data and the path selection unit 185 sets one answer candidate node. The path selection unit 185 sets the node N111 among the nodes of the hierarchical structure data as the user query node, and in the initial setting, sets the node N111 that is the user query node as the current position node.

Also, nodes N121 to N124 correspond to matching nodes. The path selection unit 185 sets the node N121 among the matching nodes as the answer candidate node. Further, the path selection unit 185 selects the path R11 from the node N111, which is the user query node, to the node N121, which is the answer candidate node.

The nodes N122 to N124 in FIG. 3 are set as items of a table in a document before conversion into document data. In the example of FIG. 3, a "table" node is provided, and the nodes N122 to N124 are child nodes of this "table" node. In this way, by making each table item into a node of a tree structure to serve as a descendant node of the "table" node indicating the tabular format, information in a tabular format can also be hierarchized in a framework of a tree structure to be handled in a unified manner, similarly to information in another format.

Figure 4:
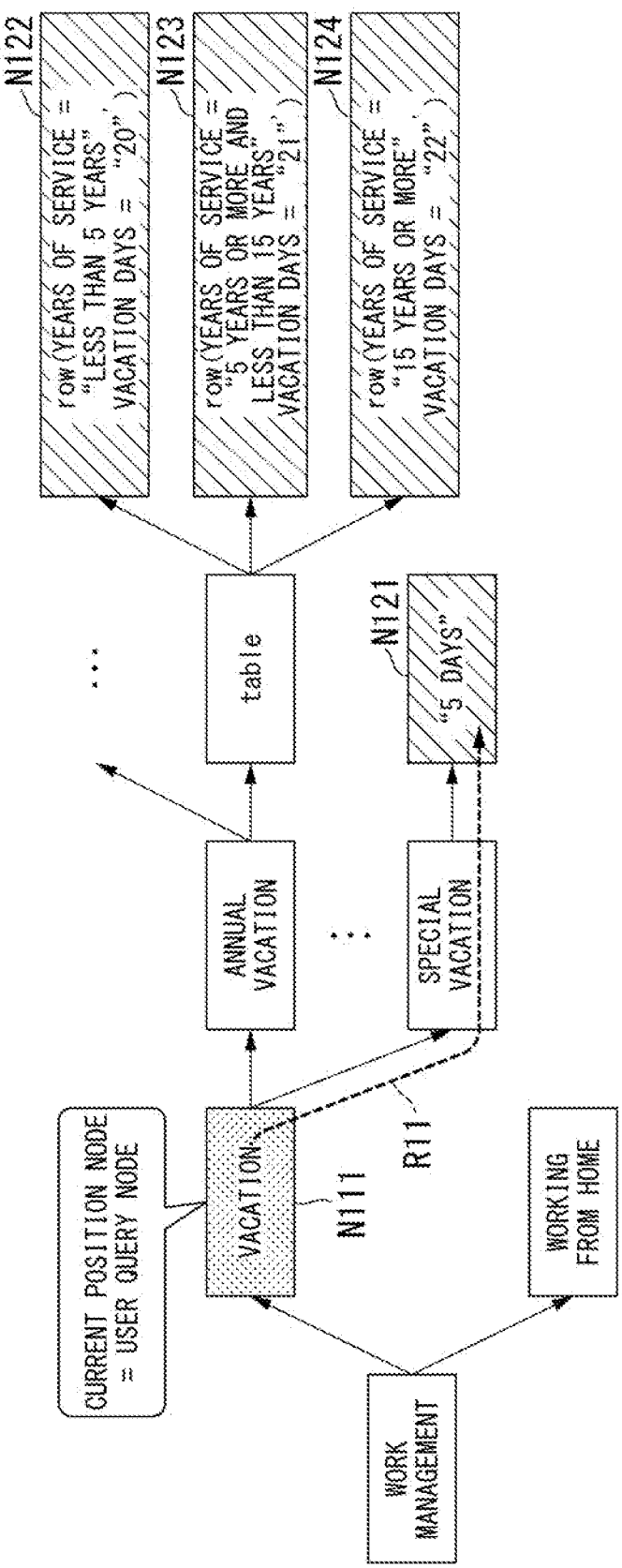
FIG. 4 is a diagram showing a second example of a current position node and answer candidate nodes according to the first example embodiment.

FIG. 4 is a diagram showing a second example of the current position node and the answer candidate nodes. FIG. 4 shows an example in which the hierarchical structure data is tree-structured data and the path selection unit 185 sets a plurality of answer candidate nodes. Similarly to the case of FIG. 3, the path selection unit 185 sets the node N111 among the nodes of the hierarchical structure data to the user query node, and in the initial setting, sets the node N111 that is the user query node to the current position node.

Further, as in the case of FIG. 3, the nodes N121 to N124 correspond to matching nodes. Unlike the case of FIG. 3, the path selection unit 185 sets all the nodes N121 to N124, which are matching nodes, as answer candidate nodes. In addition, the path selection unit 185 selects the path R11 from the node N111, which is the user query node, to the node N121, which is one of the answer candidate nodes.

The choices processing unit 186 presents information indicating the nodes included in the path selected by the path selection unit 185 to the user as choices. The presentation of the choices performed by the choices processing unit 186 corresponds to an example of the above-mentioned inquiry. The nodes indicated by the information presented to the user as choices are referred to as choice nodes.

The choices that the choices processing unit 186 presents to the user are associated with the nodes on a one-to-one basis. When the user selects one of the choices, the path selection unit 185 selects the node corresponding to the selected choice and chooses the path including that choice node. By this path selection, candidates for the node indicating the answer to the user query are narrowed down to the nodes on the selected path.

The user's selection of a choice that indicates a node is called selecting that node.

Further, when it is determined that the user does not select any choice, it is determined that the path selection unit 185 does not select the node corresponding to that choice is not selected, and it is determined that the path selection unit 185 does not select the path including that node. By determining non-selection of the path, the candidates for the node indicating the answer to the user query are narrowed down to the nodes on the path other than the path that was determined not to be selected.

By the user selecting any choice, it is determined that any other choices are not selected. Further, when the user performs a user operation indicating non-selection of a certain choice in a response to an ask-back, it is determined that the node corresponding to that choice is not selected.

The choices processing unit 186 may present to the user, as a choice node, only the node included in the path selected by the path selection unit 185, among the child nodes of the current position node, and inquire the user whether to select or exclude that node.

Figure 5:
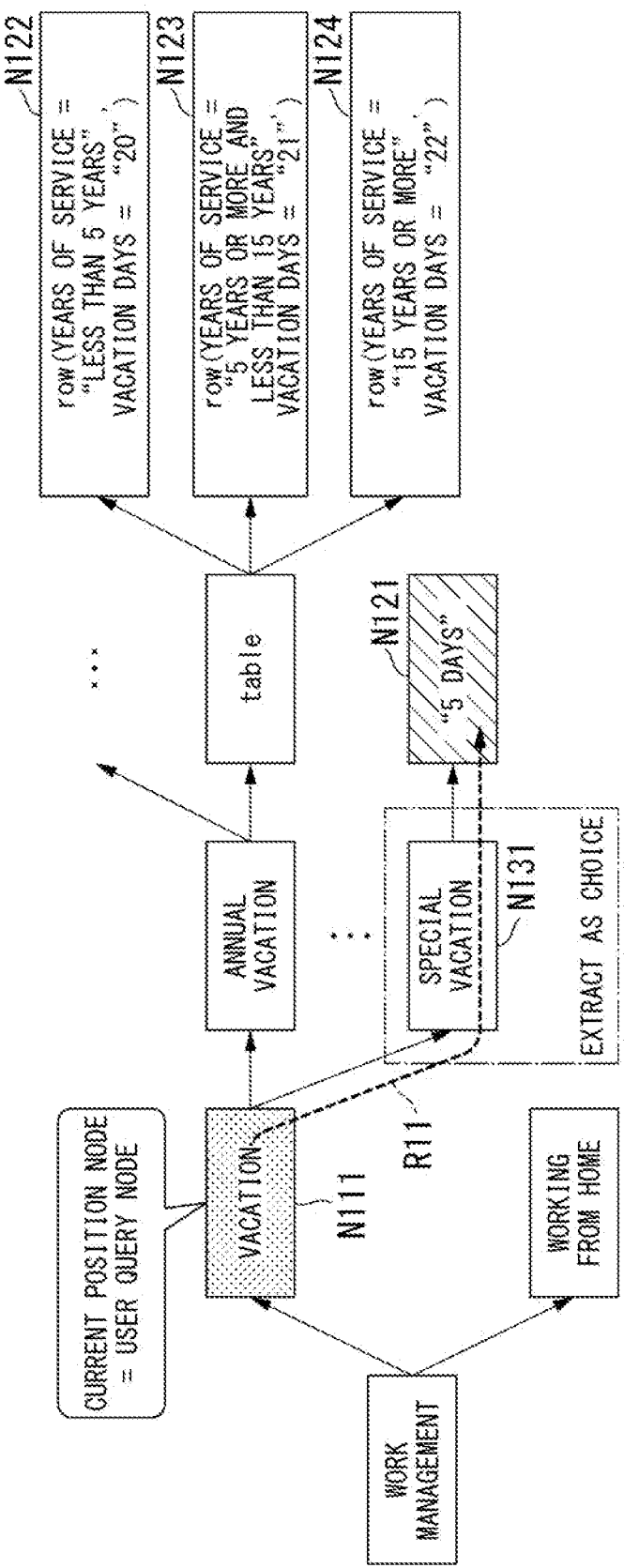
FIG. 5 is a diagram showing a first example of a node extracted as a node of a choice by a choices processing unit according to the first example embodiment.

FIG. 5 is a diagram showing a first example of a node extracted by the choices processing unit 186 as a choice node. In the example of FIG. 5, among the child nodes of the node N111 that is the current position node, the node N131 is included in the path R11. The choices processing unit 186 presents the node N131 as a choice node to the user and inquires of the user whether or not to select the node N131.

Figure 6:
FIG. 6 is a diagram showing a first example of a display screen of choices according to the first example embodiment.

FIG. 6 is a diagram showing a first example of a display screen (picture) of choices. The choices processing unit 186 presents the choices to the user by displaying the display screen of choices on the user terminal apparatus 400.

In the example of FIG. 6, the display screen of choices, which includes the display item of "(1) Special vacation", which is the operation area when the user selects the node N131, and the display item of "(N) Other", which is the operation area when the user does not select the node N131, is displayed on the user terminal apparatus 400.

If the user selects "(N) Other", it is determined that the node N131 is not selected. In this case, the path selection unit 185 reselects a path that does not pass through the node N131 as the selected path.

Figure 7:
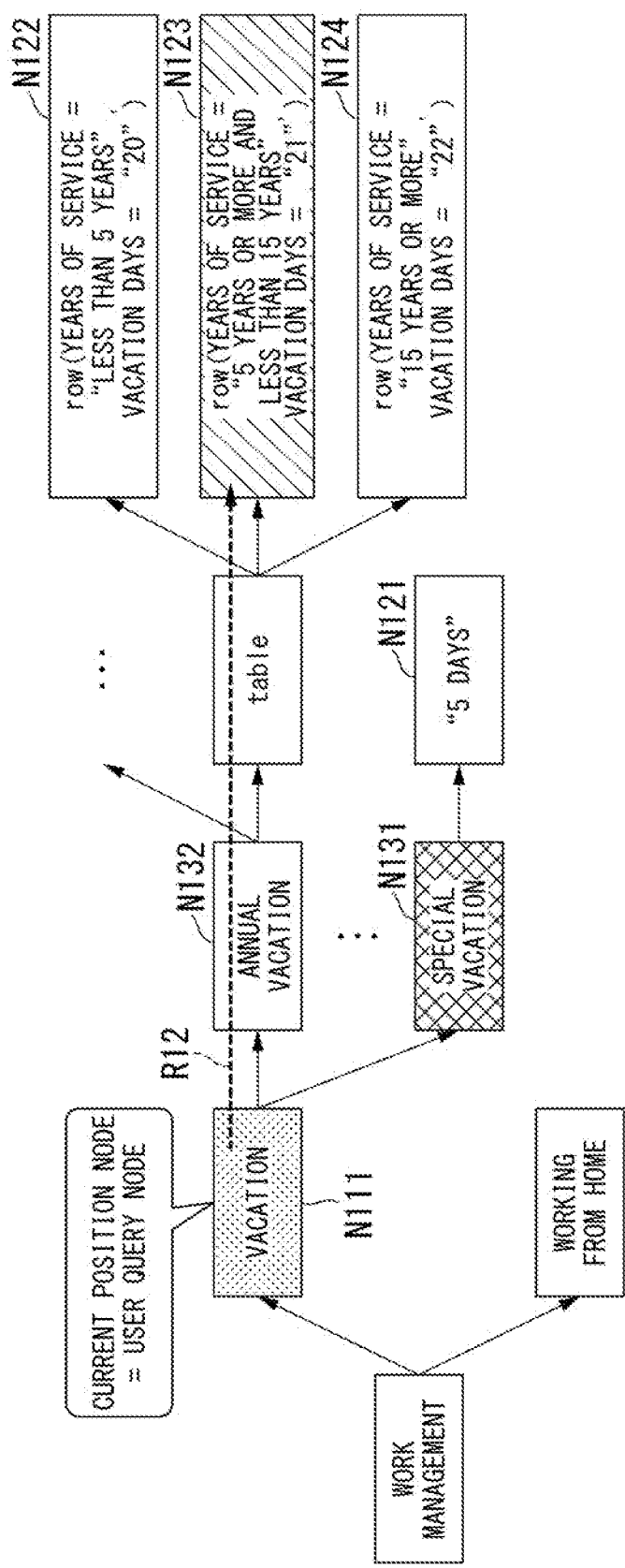
FIG. 7 is a diagram showing an example of a path that is reselected by a path selection unit according to the first example embodiment.

FIG. 7 is a diagram showing an example of a path that the path selection unit 185 reselects. FIG. 7 shows an example in which the user has selected "(N) Other" in FIG. 6 in the state of the path selection unit 185 selecting the path R11 in FIG. 5.

By determining that the user does not select the node N131, the path selection unit 185 excludes the node N121, which is the descendant of the node N131, from the candidates for the node indicating the answer to the user query.

A node that is determined as not being selected by the user among the choice nodes is called a negative node. In the example of FIG. 7, the node N131 corresponds to an example of a negative node.

In the example of FIG. 7, the path selection unit 185 selects the node N123 as the answer candidate node. Further, the path selection unit 185 selects the path R12, which is the path from the node N111, which is the current position node, to the node N123, which is the answer candidate node. The path R12 includes the node N132 among the child nodes of the node N111, which is the current position node.

Figure 8:
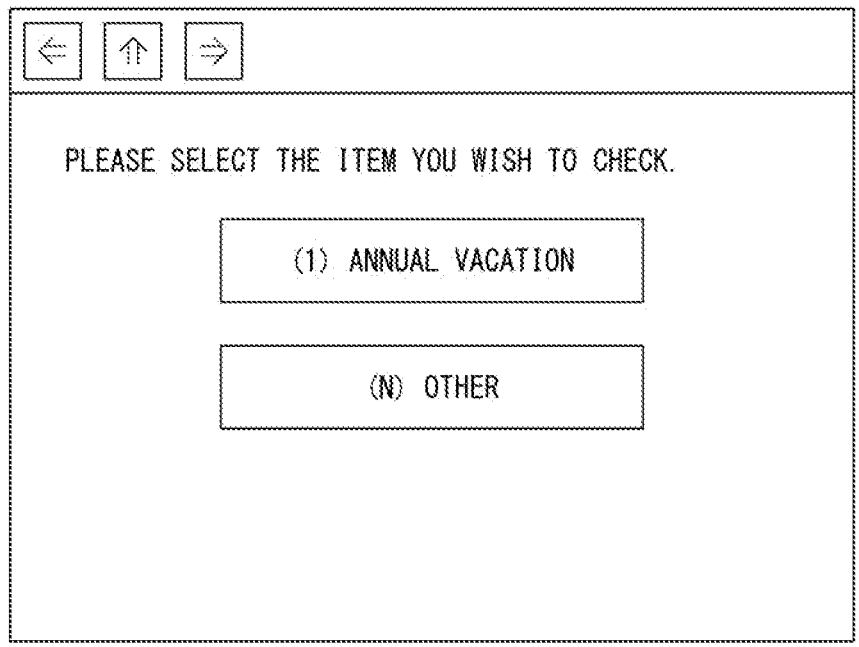
FIG. 8 is a diagram showing a second example of a display screen of choices according to the first example embodiment.

FIG. 8 is a diagram showing a second example of a display screen of choices.

In the example of FIG. 8, the display screen of choices, which includes the display item of "(1) Annual vacation", which is the operation area when the user selects the node N132, and the display item of "(N) Other", which is the operation area when the user does not select the node N132, is displayed on the user terminal apparatus 400.

When the user has selected "(1) Annual vacation", the path selection unit 185 updates the current position node from the node N111 to the node N132. In addition, the path selection unit 185 reselects a path to the path from the node N132, which is the current position node, to the node N132, which is the answer candidate node.

The choices processing unit 186 may extract all the nodes that can reach the answer candidate node among the child nodes of the current position node as the choice nodes. Since the answer candidate node can be reached through the path set by the path selection unit 185, the choices processing unit 186 presents information indicating the nodes included in the path selected by the path selection unit 185 to the user as one of the choices.

Figure 9:
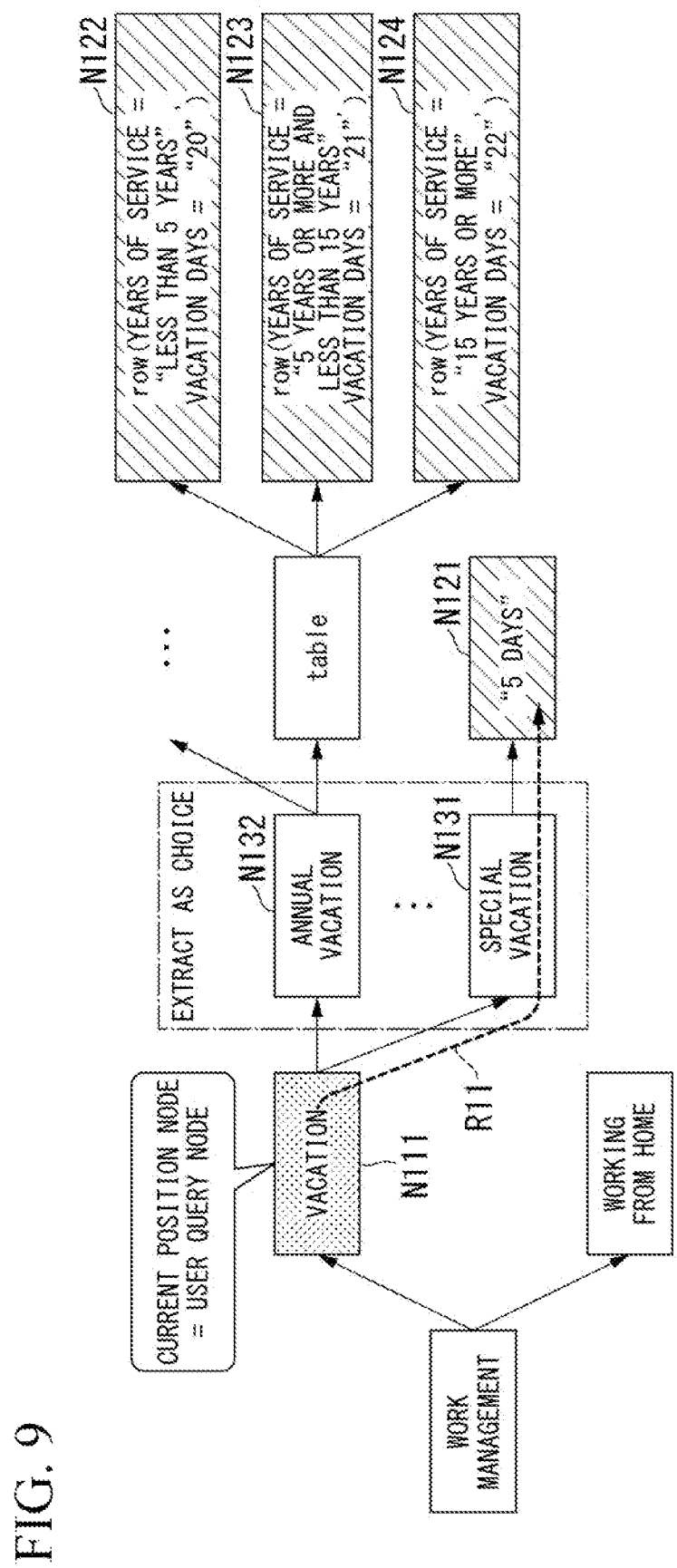
FIG. 9 is a diagram showing a second example of a node extracted as a node of choice by the choices processing unit according to the first example embodiment.

FIG. 9 is a diagram showing a second example of nodes extracted by the choices processing unit 186 as choice nodes. In the example of FIG. 9, the choices processing unit 186 extracts, as choice nodes, those nodes that can reach the answer candidate nodes among the child nodes of the node N111, which is the current position node. Each of the nodes N131 and N132 shown in FIG. 9 is a child node of the node N111 and can reach the answer candidate nodes. The choices processing unit 186 extracts the nodes N131 and N132 as choice nodes.

Figure 10:
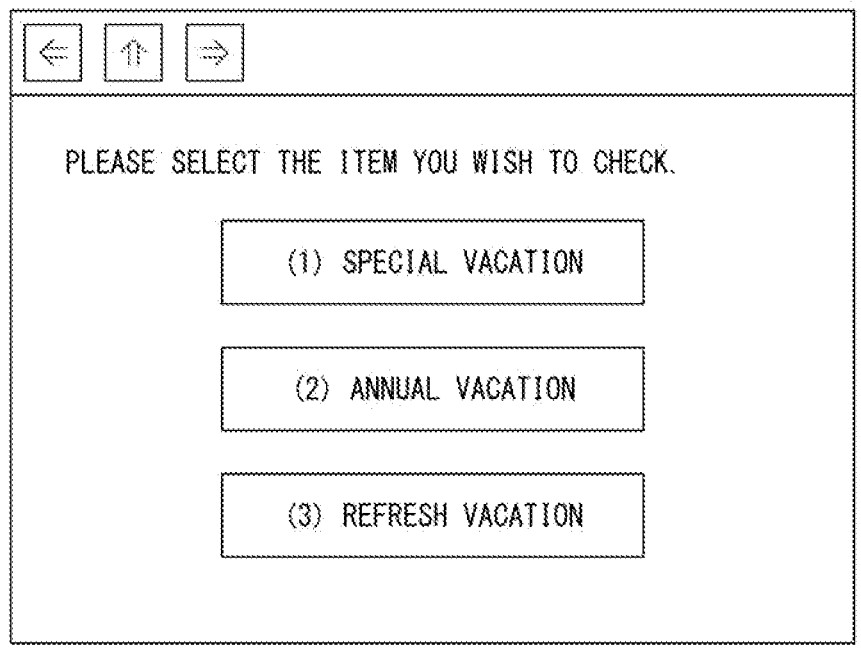
FIG. 10 is a diagram showing a third example of a display screen of choices according to the first example embodiment.

FIG. 10 is a diagram showing a third example of a display screen of choices. FIG. 10 shows an example of the display screen of choices when the choices processing unit 186 extracts all the nodes that can reach the answer candidate nodes among the child nodes of the current position node as choice nodes. The display item of "(1) Special vacation" corresponds to the choice node N131 in FIG. 9. The display item of "(2) Annual vacation" corresponds to the choice node N132 in FIG. 9. In the example of FIG. 10, there is one more node that is a child node of the current position node and that can reach an answer candidate node, and the display item of "(3) Refresh vacation" corresponds to that node.

When the user selects any of the choices, the path selection unit 185 sets the node corresponding to the selected choice as the current position node. For example, when the user selects "(2) Annual vacation", the path selection unit 185 changes the current position node from the node N111 in FIG. 9 to the node N132.

The information search unit 187 searches for information for the path selection unit 185 to reselect a path. The information for the path selection unit 185 to reselect a path is the above-mentioned auxiliary information.

When the information search unit 187 has acquired the auxiliary information, the choices processing unit 186 suppresses the presentation of choices. Specifically, the choices processing unit 186 does not perform the above-mentioned ask-back.

For example, when the user selects "(2) Annual vacation" on the screen of FIG. 10, the path selection unit 185 sets the node N132 as the current position node. When the answer candidate nodes are only the nodes N122 to N124 among the descendant nodes of the node N132, if the information search unit 187 can obtain auxiliary information indicating the years of service of the user, the path selection unit 185 can acquire an answer to the user query without having to ask-back again.

Figure 11:
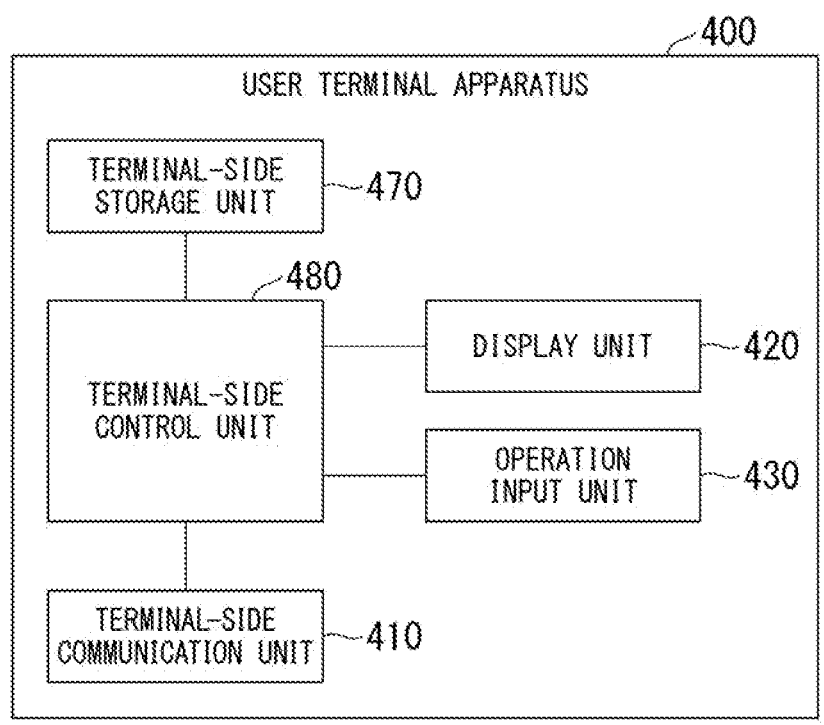
FIG. 11 is a schematic block diagram showing an example of a functional configuration of a user terminal apparatus according to the first example embodiment.

FIG. 11 is a schematic block diagram showing an example of the functional configuration of the user terminal apparatus 400. With the structure shown in FIG. 11, the user terminal apparatus 400 is provided with a terminal-side communication unit 410, a display unit 420, an operation input unit 430, a terminal-side storage unit 470, and a terminal-side control unit 480.

The terminal-side communication unit 410 communicates with other apparatuses. In particular, the terminal-side communication unit 410 receives various data to be displayed by the user terminal apparatus 400 from the question responding apparatus 100, and transmits input data indicating a user operation received by the user terminal apparatus 400 to the question responding apparatus 100.

The display unit 420 is provided with a display device such as a liquid crystal panel or a light emitting diode (LED) panel, and displays various images.

The operation input unit 430 is provided with input devices such as a keyboard and a mouse, and receives user operations.

The terminal-side storage unit 470 stores various types of data. The terminal-side storage unit 470 is configured using a storage device provided in the user terminal apparatus 400.

The terminal-side control unit 480 controls each unit of the user terminal apparatus 400 to execute various processes. The terminal-side control unit 480 is configured by a CPU that is provided in the user terminal apparatus 400, reads a program from the terminal-side storage unit 470 and executes the program.

An inference engine can be used as the path selection unit 185. In this case, from a node of hierarchical structure data, a child node of that node and a combination of edges between these nodes can be associated with knowledge in inference. The knowledge here is a rule given as a fact, and the collection of knowledge is also called background knowledge.

The rule mentioned here represents a relationship such as a causal relationship, a contextual relationship, or an implication relationship in a form of antecedent→consequent. This rule is that if the antecedent holds, the consequent holds. Propositional logic or predicate logic can be used as the description method of the antecedent and the consequent.

Also, the user query and the user's response to the ask-back are translated into observation and negation. The observation here is tautology, and is also called an observation fact. Negation is contradiction.

Also, the path from the current position node to the answer candidate node can be associated with a hypothesis in inference. The hypothesis here consists of an aggregate of rules that are assumed to explain the observation. The selection of the path from the current position node to the answer candidate node can be associated with the setting up of the hypothesis.

When an inference engine is used as the path selection unit 185, it is possible to use a deductive inference engine that traces rules from an antecedent to a consequent, and it is possible to use an inductive inference engine that traces rules from a consequent to an antecedent.

When a deductive inference engine is used as the path selection unit 185, it is possible to detect a path that is a candidate for a hypothesis by tracing descendant nodes from the current position node and reaching a matching node.

When an inductive inference engine is used as the path selection unit 185, it is possible to detect a path that is a candidate for a hypothesis by tracing the ancestor nodes from the matching nodes and reaching the current position node.

Alternatively, as the path selection unit 185, an inference engine that uses both the deductive method and the inductive method may be used. In this case, the process of tracing the descendant nodes from the current position node and the process of tracing the ancestor nodes from the matching nodes can be used together to detect a path that is a candidate for a hypothesis.

Next, the operation of the question responding apparatus 100 will be described with reference to FIG. 12.

Figure 12:
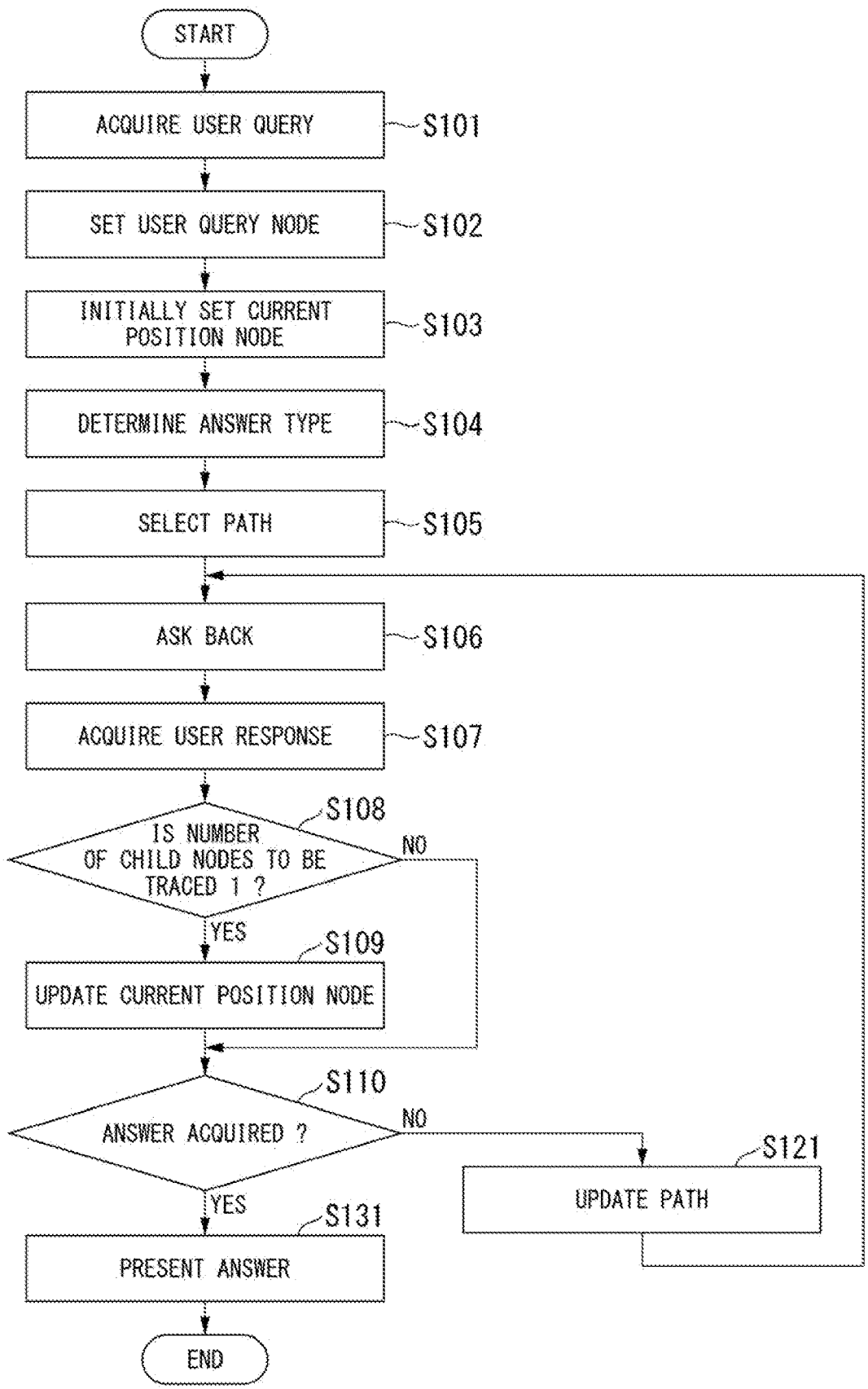
FIG. 12 is a flowchart showing an example of a processing procedure in which the question responding apparatus according to the first example embodiment answers a user query.

FIG. 12 is a flowchart showing an example of a processing procedure in which the question responding apparatus 100 answers a user query.

In the process of FIG. 12, the answering-side communication unit 110 acquires a user query (Step S101). Specifically, the user terminal apparatus 400 receives a user operation for inputting a user query and transmits the input data to the question responding apparatus 100, and the answering-side communication unit 110 receives the input data from the user terminal apparatus 400.

Next, the topic processing unit 183 sets a user query node on the basis of the user query (Step S102). Specifically, the topic processing unit 183 extracts a topic from the user query. Then, the topic processing unit 183 sets any one of the nodes of the hierarchical structure data as the user query node on the basis of the extracted topic.

Then, the path selection unit 185 initially sets the node set as the user query node by the topic processing unit 183, as the current position node (Step S103).

Also, the type determination unit 184 determines the answer type on the basis of the user query (Step S104).

Then, the path selection unit 185 sets an answer candidate node on the basis of the answer type and selects a path from the current position node to the answer candidate node (Step S105). The path selection unit 185 may select the path from the current position node to the answer candidate node after setting the answer candidate node. Alternatively, the path selection unit 185 may set the answer type and select the path by tracing descendant nodes from the current position node and determining whether or not the node that has been reached matches the answer type.

Next, the choices processing unit 186 performs an ask-back to the user (Step S106). As described above, the choices processing unit 186 may present only a node included in the path selected by the path selection unit 185 among the child nodes of the current position node to the user as the choice nodes, and inquire the user whether to select that node. Alternatively, the choices processing unit 186 may extract all the nodes that can reach the answer candidate node among the child nodes of the current position node as choice nodes, and inquire the user which of the extracted choices is/are selected.

Then, the answering-side communication unit 110 acquires the user's response to the ask-back (Step S107). Specifically, the user terminal apparatus 400 receives the input operation of the response of the user, and transmits the input data indicating the received input operation to the question responding apparatus 100. The answering-side communication unit 110 acquires the user's response to the ask-back by receiving the input data.

The path selection unit 185 determines whether or not the child nodes capable of reaching the answer candidate node among the child nodes of the current position node are narrowed down to one (Step S108).

When it is determined that the number of child nodes capable of reaching the answer candidate node is narrowed down to one (Step S108: YES), the path selection unit 185 updates the current position node to that child node (Step S109).

Next, the path selection unit 185 determines whether or not an answer has been acquired (Step S110). Specifically, the path selection unit 185 determines whether or not the current position node has reached the answer candidate node.

If it is determined that the answer has not been acquired (Step S110: NO), the path selection unit 185 reselects a new path as the selected path (Step S121).

After Step S121, the process returns to Step S106.

In contrast, if it is determined that the answer has been obtained in Step S110 (Step S110: YES), the path selection unit 185 presents the answer to the user (Step S131). Specifically, the path selection unit 185 extracts an answer from the answer candidate node reached by the current position node, transmits the answer to the user terminal apparatus 400 via the answering-side communication unit 110, and causes the display unit 420 of the user terminal apparatus 400 to display the answer.

After Step S131, the question responding apparatus 100 ends the process of FIG. 12.

In contrast, if the path selection unit 185 determines in Step S108 that the number of child nodes capable of reaching the answer candidate nodes has not been narrowed down to one (Step S108: NO), the process proceeds to Step S110.

As described above, the type determination unit 184 determines the type of answer to the question on the basis of the question from the user. The path selection unit 185 selects one of the paths from the selected current position node among the nodes in the hierarchical structure data to the matching node that matches the type of answer. The choices processing unit 186 presents information indicating the nodes included in the selected path to the user as choices.

In this way, the path selection unit 185 can preferentially present to the user choices capable of reaching the matching nodes by selecting paths capable of reaching the matching nodes, or can suppress the presentation of choices not capable of reaching the matching node. That is, the path selection unit 185 can preferentially present to the user choices by which an answer may be obtained. Alternatively, the path selection unit 185 can present to the user only the choices by which an answer may be obtained.

Thereby, it is expected that the number of times that the question responding apparatus 100 re-presents choices until the user selects one of the choices will be relatively small. In this respect, with the question responding apparatus 100, the process of the question responding apparatus 100 can be relatively small when an ask-back to the user is performed and the answer is extracted from the document.

Further, with the question responding apparatus 100, the number of times that the question responding apparatus 100 re-presents choices until the user selects one of the choices will be relatively small, and thus it is expected that the time until an answer to the question is obtained will be relatively short.

Also, the user can determine whether or not to select a choice, giving priority to choices by which an answer may be obtained. Alternatively, the user can determine whether or not to select only choices with a possibility of obtaining an answer, or whether to select any of the choices. In this respect, with the question responding apparatus 100, it is expected that the number of times the user makes a determination regarding the selection of choices is relatively small, and the burden on the user is relatively small.

Further, the path selection unit 185 reselects a path in accordance with the user's response to the presentation of choices.

Thereby, the question responding apparatus 100 can obtain an answer by repeating a relatively simple process of presenting choices to the user and reselecting a path in accordance with the response. In this respect, the process of the question responding apparatus 100 is relatively small. In addition, since the process performed by the question responding apparatus 100 is relatively simple, the processing ability of the question responding apparatus 100 can be relatively small, and the manufacturing cost of the question responding apparatus 100 can be relatively low.

Further, when the path selection unit 185 selects one path and the user's response indicates that the node included in the selected path is not selected, the path selection unit 185 reselects one path other than the selected path.

Thereby, it is sufficient for the user to make a relatively simple determination to determine whether or not to select the presented choice. In this respect, with the question responding apparatus 100, the burden on the user is relatively small.

The information search unit 187 also searches for information for reselection of a path. The choices processing unit 186 suppresses the presentation of choices when the information search unit 187 acquires information for path reselection.

When the information search unit 187 acquires the information for path reselection, the choices processing unit 186 suppresses the presentation of the choices, so that the choices presented to the user can be relatively small. In this respect, with the question responding apparatus 100, the burden on the user is relatively small.

Second Example Embodiment

The question responding apparatus 100 may select a plurality of paths. In the second example embodiment, this case will be described.

The configurations of the apparatuses of a question responding system according to the second example embodiment are similar to those of the first example embodiment, and FIG. 1 is cited. The functional configuration of the user terminal apparatus 400 according to the second example embodiment is also similar to that of the first example embodiment, and FIG. 11 is cited.

Figure 13:
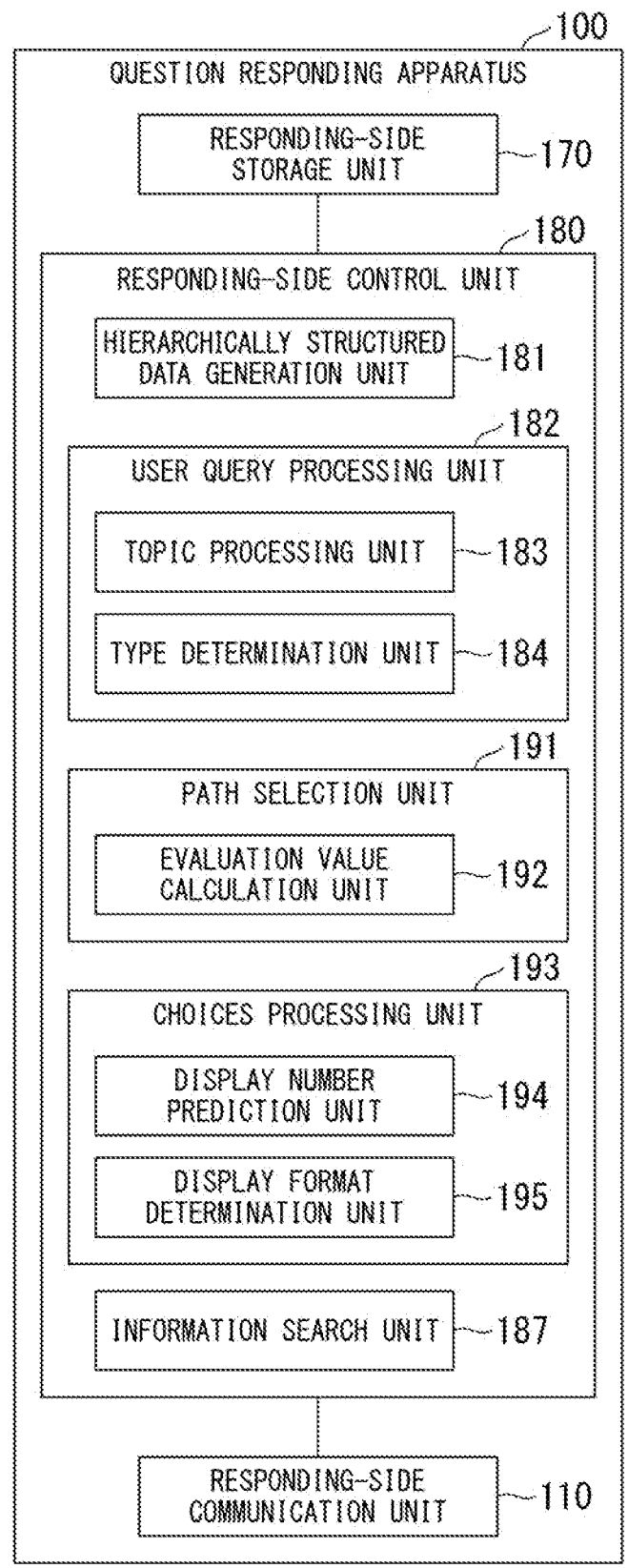
FIG. 13 is a schematic block diagram showing an example of a functional configuration of a question responding apparatus according to a second example embodiment.

FIG. 13 is a schematic block diagram showing an example of the functional configuration of the question responding apparatus 100 according to the second example embodiment. In the configuration shown in FIG. 13, a path selection unit 191 differs from the path selection unit 185 of FIG. 1 in that the path selection unit 191 is provided with an evaluation value calculation unit 192. Moreover, in the configuration shown in FIG. 13, a choices processing unit 193 differs from the choices processing unit 186 of FIG. 1 in that the choices processing unit 193 is provided with a display number prediction unit 194 and a display format determination unit 195. The second example embodiment is otherwise the same as the first example embodiment.

The question responding apparatus 100 corresponds to an example of the display format determining apparatus, and determines the display format of the choices presented to the user.

As in the case of the path selection unit 185, the path selection unit 191 selects one of the paths from the selected current position node among the nodes in the hierarchical structure (hierarchical structure data) of information to the matching nodes that match the answer type. Then, the path selection unit 185 reselects a path in accordance with the user's response to the presentation of the choices by the choices processing unit 186 performing an ask-back to the user.

Unlike the case of the path selection unit 185, the path selection unit 191 selects k paths. k is a preset constant that is an integer greater than or equal to 2.

When the user's response to the ask-back indicates that a node included in any of the paths selected by the path selection unit 191 is selected, the path selection unit 191 sets the node selected by the user as the current position node and reselects a path.

Alternatively, the value of k may be set to 1. In this case, like the path selection unit 185, the path selection unit 191 selects one path and reselects a path in accordance with the user's response to the ask-back.

The evaluation value calculation unit 192 calculates an evaluation value for each of the paths from the current position node to the answer candidate nodes. The evaluation value calculation unit 192 calculates a high evaluation value for the path including the node of the choice that the user is likely to select in the response to the ask-back.

For example, the answering-side storage unit 170 stores, for each node of the hierarchical structure data, a history of the user having selected that node in a response to an inquiry. Then, the evaluation value calculation unit 192 calculates, for each of the paths from the current position node to the answer candidate nodes, the number of times the user has selected a node included in that path among the child nodes of the current position node, as the evaluation value of that path.

The path selection unit 191 selects k paths in descending order of the evaluation calculated by the evaluation value calculation unit 192.

Figure 14:
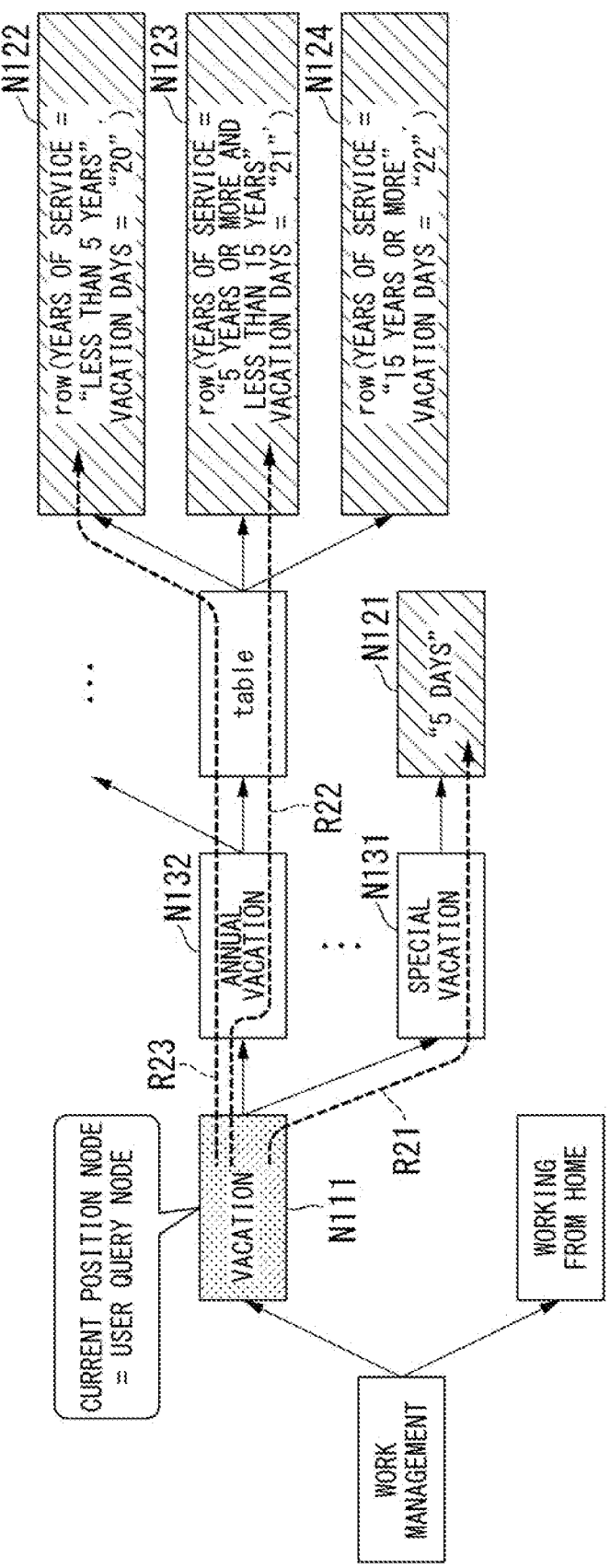
FIG. 14 is a diagram showing a first example of a plurality of paths selected by a path selection unit according to the second example embodiment.

FIG. 14 is a diagram showing a first example of a plurality of paths selected by the path selection unit 191. The hierarchical structure data of FIG. 14 is similar to that in the case of FIG. 3, and FIG. 14 shows an example of the case of k=3. Similarly to the case of FIG. 3, the path selection unit 191 sets the node N111 among the nodes of the hierarchical structure data to the user query node, and sets the node N111, which is the user query node in the initial setting, to the current position node.

Also, as in the case of FIG. 3, the nodes N121 to N124 correspond to matching nodes. As in the case of FIG. 4, the path selection unit 191 sets all the nodes N121 to N124 that are the matching nodes as answer candidate nodes.

Also, the path selection unit 191 selects three paths R21, R22, and R23. The path R21 is a path from the node N111 to the node N121. The path R22 is a path from the node N111 to the node N123. The path R23 is a path from the node N111 to the node N122. The evaluation value calculation unit 192 of the path selection unit 191 calculates an evaluation value for each of the paths from the current position node to all the answer candidate nodes, and the path selection unit 191 selects the three paths R21, R22, and R23 in descending order of evaluation value.

Figure 15:
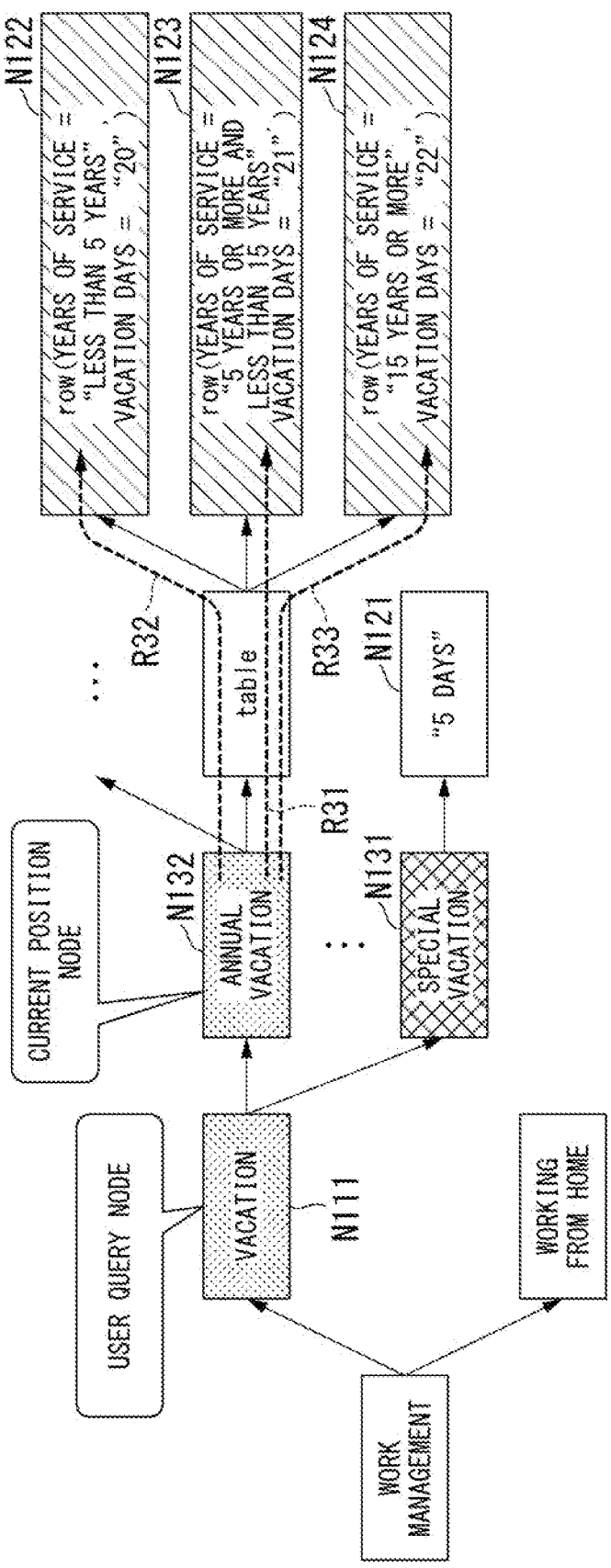
FIG. 15 is a diagram showing a second example of a plurality of paths selected by the path selection unit according to the second example embodiment.

FIG. 15 is a diagram showing a second example of a plurality of paths selected by the path selection unit 191. FIG. 15 shows an example in which the user selects the node N132 in response to the ask-back in the example of FIG. 14. The path selection unit 191 re-sets the node N132 as the current position node and selects three paths R31, R32, and R33. The path R31 is a path from the node N111 to the node N123. The path R32 is a path from the node N111 to the node N122. The path R33 is a path from the node N111 to the node N124. The evaluation value calculation unit 192 of the path selection unit 191 calculates an evaluation value for each of the paths from the current position node to all the answer candidate nodes, and the path selection unit 191 selects the three paths R31, R32, and R33 in descending order of evaluation value.

As the method for the path selection unit 191 to calculate the evaluation value of the path, for example, a known method such as a method for calculating a hypothetical cost in the weighted abduction of Hobbs can be used. However, the method by which the path selection unit 191 calculates the evaluation value of a path is not limited to a specific method provided the method is one that can calculate the evaluation value of the possibility of obtaining the answer to the user query on that path.

The choices processing unit 193 presents information indicating the node included in the path selected by the path selection unit 191 to the user as a choice. The presentation of the choice performed by the choices processing unit 193 corresponds to the example of the above-mentioned ask-back.

The display number prediction unit 194 calculates a value indicating a prediction of the number of choices displayed until any one of the choices is selected, on the basis of an index value given to each of the choices in the ask-back.

The display number prediction unit 194 may calculate, for each choice, the probability of the user selecting that choice on the basis of the history of the interaction between the question responding system 1 and the user, the browsing history of pages of the document by the user, and the like, and may use the probability as an index value. However, the index value used by the display number prediction unit 194 is not limited to a specific value as long as the index value indicates, for each choice, the degree of possibility of the user selecting that choice. The total of the index values of all choices does not have to be 1. For example, the evaluation value calculated by the path selection unit 191 for each path may be used as index values of choices indicating the nodes included in that path.

The display format determination unit 195 determines the display format of the choices on the basis of the calculated values.

Figure 16:
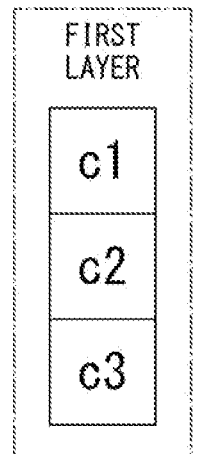
FIG. 16 is a diagram showing a first example of a hierarchical pattern of display items according to the second example embodiment.

FIG. 16 is a diagram showing a first example of a hierarchical pattern of display items. In the example of FIG. 16, all of the three display items c1, c2, and c3 are included in the first layer.

In the hierarchical pattern of the display items, each layer shows a group of display items displayed on one screen. The layer number ("i" in "the i-th layer", i being a positive integer) indicates an identifier for identifying the layer. The display item number ("j" of "cj", j being a positive integer) indicates an identifier for identifying the display item.

The pattern of FIG. 16 indicates that the three display items c1, c2, and c3 are displayed on one screen, for example, in the order of c1, c2, and c3 from the top. The pattern shown in FIG. 16 is called a first pattern. The first pattern corresponds to an example of the display format. The second to fourth patterns, which will be described later, also correspond to examples of the display format.

Figure 17:
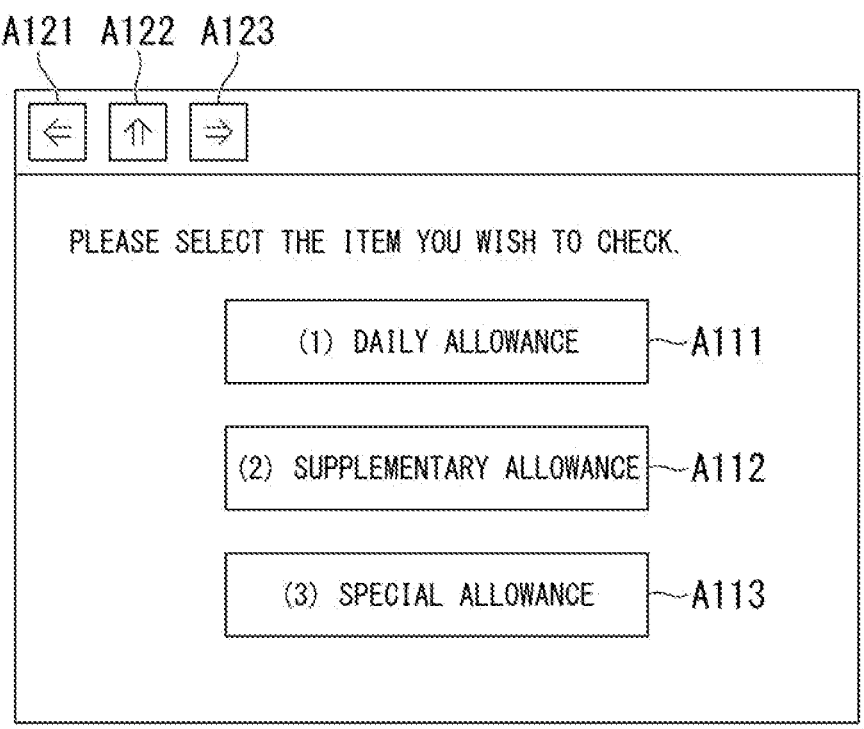
FIG. 17 is a diagram illustrating an example of a display screen when a choices processing unit according to the second example embodiment selects the first pattern.

FIG. 17 is a diagram showing an example of a display screen when the choices processing unit 193 selects the first pattern. FIG. 17 shows an example in which there are three choices, that is, daily allowance, supplementary allowance, and special allowance in an ask-back to a user query for inquiring about the amount of allowance. The evaluation value calculation unit 192 calculates a higher evaluation value in the order of daily allowance, auxiliary allowance, and special allowance.

The choices processing unit 193 generates image data of a display screen that displays all three choices of daily allowance, auxiliary allowance, and special allowance in accordance with the first pattern. The choices processing unit 193 displays the three choices in the order of daily allowance, auxiliary allowance, and special allowance on the basis of the evaluation values calculated by the evaluation value calculating unit 192.

An area A111 is a display area for the daily allowance, which is the first choice. "(1)" in the area A111 indicates the number "1" for user operation. An area A112 is a display area for the auxiliary allowance, which is the second choice. "(2)" in the area A112 indicates the number "2" for user operation. An area A113 is a display area for the special allowance, which is the third choice. "(3)" in the area A113 indicates the number "3" for user operation.

In the example of FIG. 17, the display unit 420 of the user terminal apparatus 400 displays the display screen of FIG. 17 in accordance with the instruction of the choices processing unit 193. The user can select any of the choices by performing a user operation on the operation input unit 430.

Specifically, the user can select the daily allowance by mouse-clicking or touching the area A111, or by pressing the "1" button on the keyboard. Also, the user can select the auxiliary allowance by mouse-clicking or touching the area A112, or by pressing the "2" button on the keyboard. Also, the user can select the auxiliary allowance by mouse-clicking or touching the area A113, or by pressing the "3" button on the keyboard.

An area A121 is an area for receiving a user operation for instructing the display of the previous screen. The previous screen here is the screen that the display unit 420 was displaying immediately before. When the user wants to return to the previous screen to perform an operation again, the user mouse-clicks or touches the area A121 to display the previous screen on the display unit 420.

An area A122 is an area for receiving a user operation for instructing a return to the first screen when there are a plurality of display screens for choices. When the user wants to return to the first screen among the display screens for choices and perform an operation again, the user mouse-clicks or touches the area A122 to display the first screen on the display unit 420.

The area A121 is an area for receiving a user operation for instructing the display of the next screen. The next screen here refers to the screen which, when the display unit 420 has returned to the display of the previous screen, is the screen prior to returning to the previous screen. When the user wants to cancel an operation on the area A121, the user mouse-clicks or touches an area A123 to display the next screen on the display unit 420.

Figure 18:
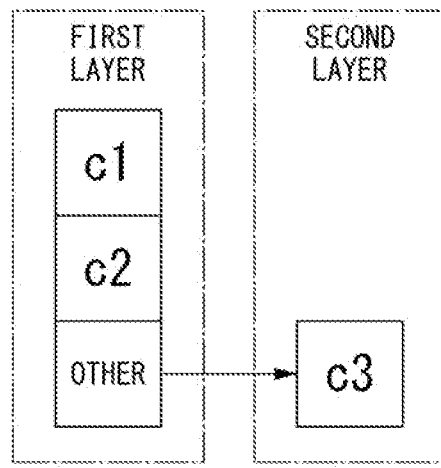
FIG. 18 is a diagram showing a second example of a hierarchical pattern of display items according to the second example embodiment.

FIG. 18 is a diagram showing a second example of a hierarchical pattern of display items. In the example of FIG. 18, among the three display items, the display items c1 and c2 are included in the first layer, and the display item c3 is included in the second layer.

The pattern of FIG. 18 indicates that, first, the display item c1, the display item c2, and the item "other" in the first layer are displayed. When the item "other" is selected, the display item c3 is displayed. The pattern of FIG. 18 is called a second pattern.

Figure 19:
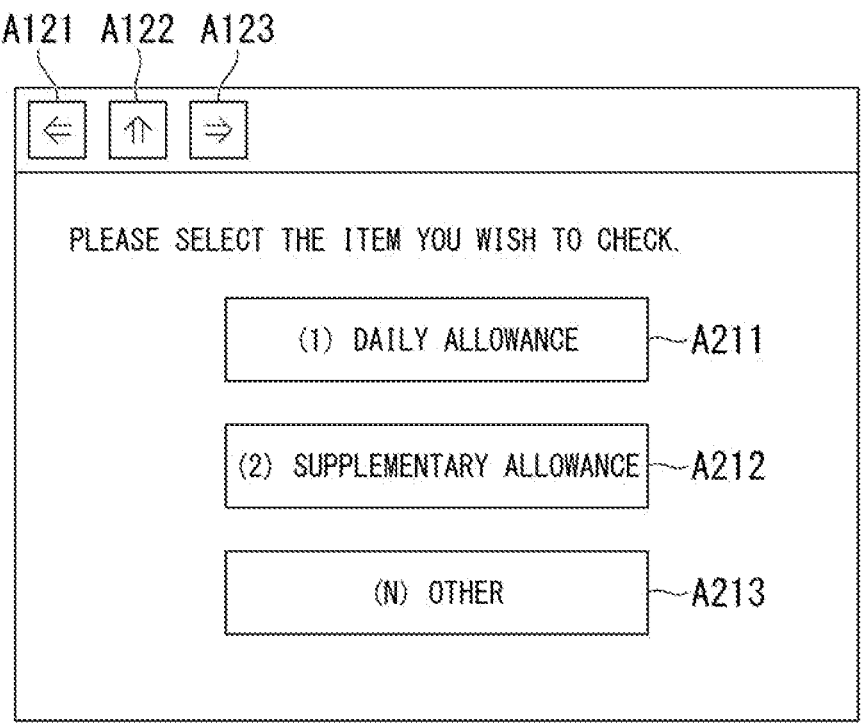
FIG. 19 is a diagram showing an example of a first screen when the choices processing unit according to the second example embodiment selects the second pattern.

FIG. 19 is a diagram showing an example of the first screen when the choices processing unit 193 selects the second pattern. Similarly to the case of FIG. 17, FIG. 19 shows an example in which there are three choices, that is, daily allowance, supplementary allowance, and special allowance in an ask-back to a user query for inquiring about the amount of allowance. The evaluation value calculation unit 192 calculates a higher evaluation value in the order of daily allowance, auxiliary allowance, and special allowance.

The choices processing unit 193 generates the image data of the first screen displaying the two choices of the daily allowance and the auxiliary allowance in accordance with the second pattern. The choices processing unit 193 sets the order in which the two choices are displayed to the order of daily allowance and auxiliary allowance from the top, on the basis of the evaluation values calculated by the evaluation value calculation unit 192.

An area A211 is similar to the area A111 in FIG. 17. An area A212 is similar to the area A112 in FIG. 17.

An area A213 is an area for receiving a user operation to display the next screen on the display unit 420. "(N)" in the area A113 indicates a symbol "N" for user operation. The user can display the second screen, which is the next screen, on the display unit 420 by mouse-clicking or touching the area A213 or pressing the "N" button on the keyboard.

The Areas A121, A122, and A123 are all the same as in the case of FIG. 17.

Figure 20:
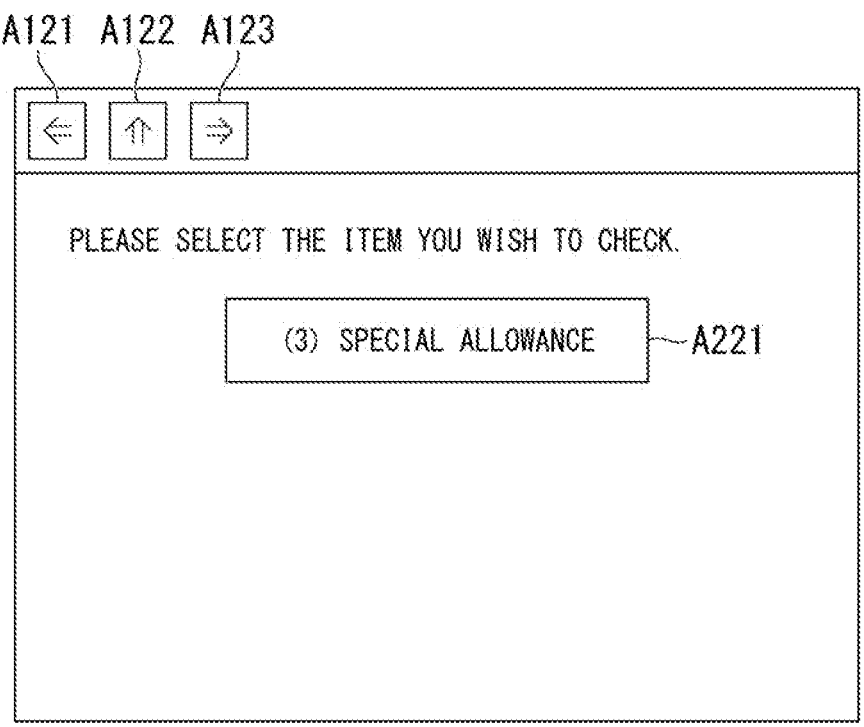
FIG. 20 is a diagram showing an example of a second screen when the choices processing unit according to the second example embodiment selects the second pattern.

FIG. 20 is a diagram showing an example of the second screen when the choices processing unit 193 has selected the second pattern. FIG. 20 shows an example of the second screen of the display screen for choices in the case of the example of FIG. 19.

When the user mouse-clicks or touches the area A213 on the first screen of FIG. 19 or presses the "N" button on the keyboard, the choices processing unit 193 generates the image data of the second screen that displays the choice of special allowance, in accordance with the second pattern.

An area A221 is similar to the area A113 of FIG. 17.

The areas A121, A122, and A123 are all the same as in the case of FIG. 17.

Figure 21:
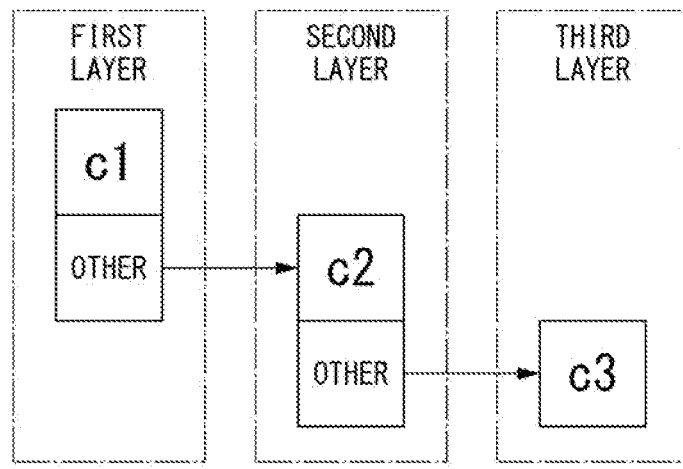
FIG. 21 is a diagram showing a third example of a hierarchical pattern of display items according to the second example embodiment.

FIG. 21 is a diagram showing a third example of a hierarchical pattern of display items. In the example of FIG. 21, among the three display items, the display item c1 is included in the first layer, the display item c2 is included in the second layer, and the display item c3 is included in the third layer.

The pattern of FIG. 21 shows that the display item c1 and the "other" item are displayed on the first screen. This pattern shows that the display item c2 is displayed on the second screen when the "other" item is selected on the first screen. This pattern shows that the display item c3 is displayed on the third screen when the "other" item is selected on the second screen. The pattern shown in FIG. 21 is called a third pattern.

Figure 22:
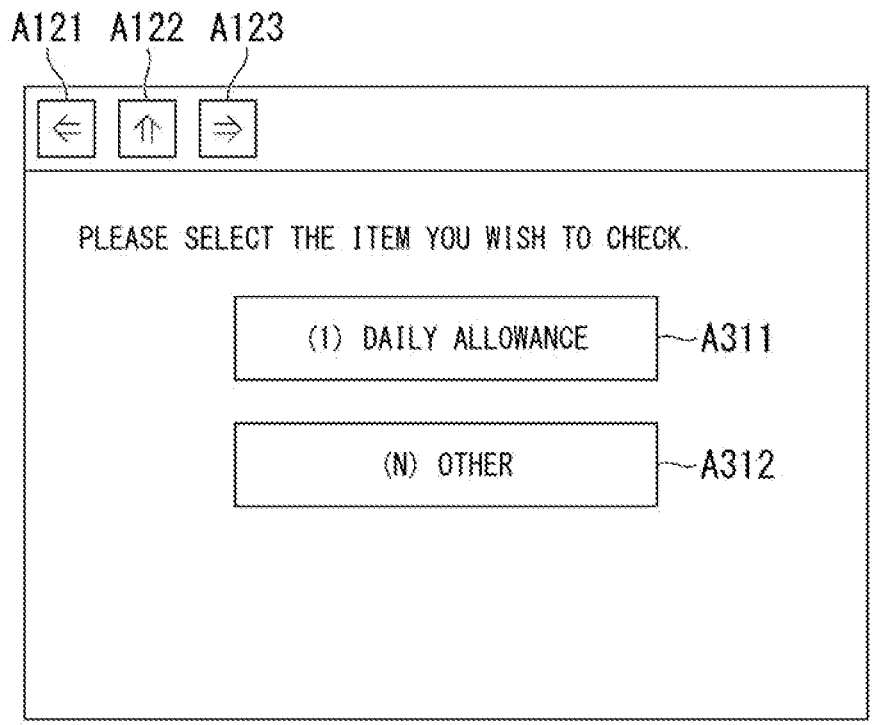
FIG. 22 is a diagram showing an example of the first screen when the choices processing unit according to the second example embodiment selects the third pattern.

FIG. 22 is a diagram showing an example of the first screen when the choices processing unit 193 has selected the third pattern. Similarly to the case of FIG. 17, FIG. 22 shows an example in which there are three choices, that is, daily allowance, supplementary allowance, and special allowance in an ask-back to a user query for inquiring about the amount of allowance. The evaluation value calculation unit 192 shows a higher evaluation value in the order of daily allowance, auxiliary allowance, and special allowance.

The choices processing unit 193 generates the image data of the first screen displaying the choice of daily allowance in accordance with the third pattern.

An area A311 is similar to the area A111 in FIG. 17.

An area A312 is similar to the area A213 in FIG. 19. The user can display the second screen, which is the next screen, on the display unit 420 by mouse-clicking or touching the area A312 or pressing the "N" button on the keyboard.

The areas A121, A122, and A123 are all the same as in the case of FIG. 17.

Figure 23:
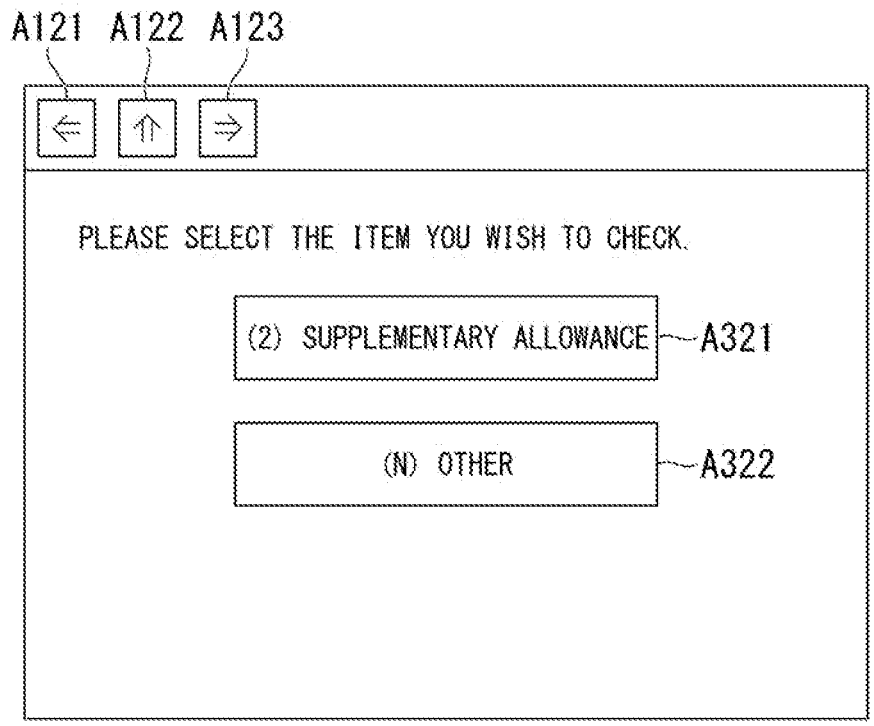
FIG. 23 is a diagram showing an example of the second screen when the choices processing unit according to the second example embodiment selects the third pattern.

FIG. 23 is a diagram showing an example of the second screen when the choices processing unit 193 has selected the third pattern. FIG. 23 shows an example of the second screen of the display screen of choices in the case of the example of FIG. 22.

When the user mouse-clicks or touches the area A312 on the first screen in FIG. 22 or presses the "N" button on the keyboard, the choices processing unit 193 generates the image data for the second screen that displays the choice of the auxiliary allowance, in accordance with the third pattern.

An area A311 is similar to the area A111 in FIG. 17.

An area A312 is similar to the area A213 in FIG. 19. The user can display the third screen, which is the next screen, on the display unit 420 by mouse-clicking on or touching the area A312 or by pressing the "N" button on the keyboard.

The areas A121, A122, and A123 are all the same as in the case of FIG. 17.

The third screen when the choices processing unit 193 has selected the third pattern is the same as the second screen when the choices processing unit 193 has selected the second pattern, which was described with reference to FIG. 20.

Figure 24:
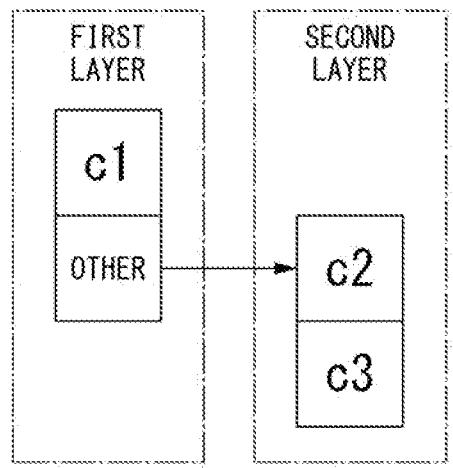
FIG. 24 is a diagram showing a fourth example of a hierarchical pattern of display items according to the second example embodiment.

FIG. 24 is a diagram showing a fourth example of a hierarchical pattern of display items. In the example of FIG. 24, among the three display items, the display item c1 is included in the first layer and the two display items c2 and c3 are included in the second layer.

The pattern in FIG. 24 indicates that the display item c1 and the "other" item are displayed on the first screen. This pattern shows that the display items c2 and c3 are displayed on the second screen when the "other" item is selected on the first screen. The pattern shown in FIG. 24 is referred to as a fourth pattern.

The first screen when the choices processing unit 193 has selected the fourth pattern is the same as the first screen when the choices processing unit 193 has selected the third pattern, which was described with reference to FIG. 22.

Figure 25:
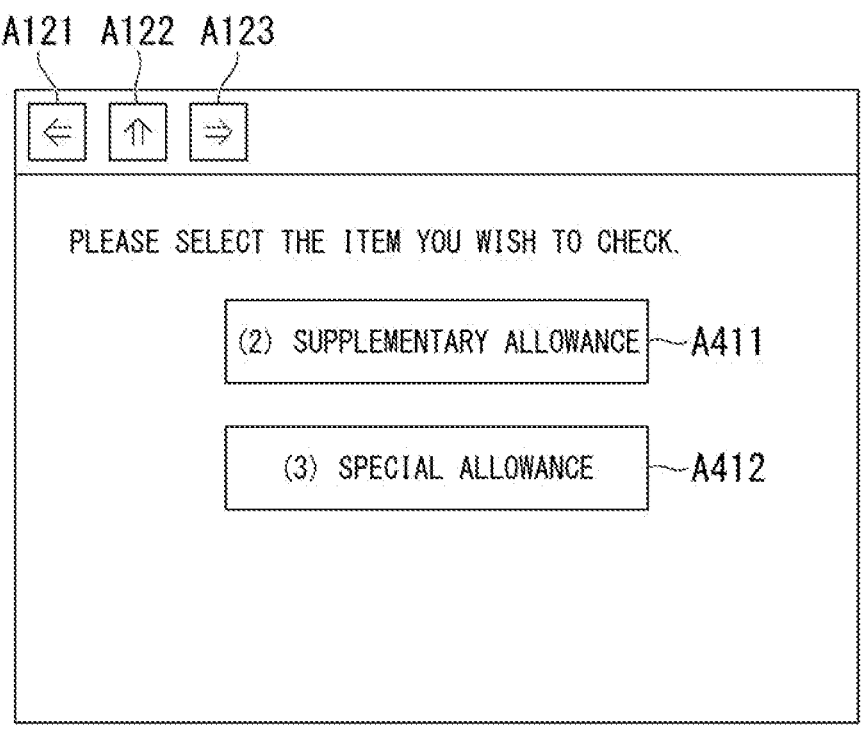
FIG. 25 is a diagram showing an example of the second screen when the choices processing unit according to the second example embodiment selects the fourth pattern.

FIG. 25 is a diagram showing an example of the second screen when the choices processing unit 193 has selected the fourth pattern. FIG. 25 shows an example of the second screen of the display screen of choices in the case of the example of FIG. 24.

When the choices processing unit 193 has selected the fourth pattern, the choices processing unit 193 generates the image data of the second screen displaying the choices of auxiliary allowance and special allowance in accordance with the fourth pattern when the display area "(N) Other" was mouse-clicked or touched on the first screen, or the "N" button on the keyboard was pressed.

An area A411 is similar to the area A112 in FIG. 17. An area A412 is similar to the area A113 in FIG. 17.

The areas A121, A122, and A123 are all the same as in the case of FIG. 17.

For example, the display number prediction unit 194 calculates, for each choice, the probability that the user will select that choice as an index value. Then, the display number prediction unit 194 calculates an expected value as a value indicating a prediction of the number of choices displayed until any one of the choices is selected.

For example, the answering-side storage unit 170 stores in advance the four patterns from the first pattern to the fourth pattern described above. It is assumed that the display number prediction unit 194 calculates the probability that the user selects the choice c1 as 0.9, the probability that the user selects the choice c2 as 0.05, and the probability that the user selects the choice c3 as 0.05.

In this case, the display number prediction unit 194 calculates an expected value of the number of choices displayed until any one of the choices is selected in the first pattern (illustrated in FIG. 16) as in Expression (2).

[Expression 2]

$$0.9 \times 3 + 0.05 \times 3 + 0.05 \times 3 = 3 \qquad (2)$$

In the case of the first pattern, all the choices c1, c2, and c3 are displayed on one display screen. Therefore, when the user has selected any one of the choices c1, c2, and c3, the number of displayed choices is three.

Therefore, the display number prediction unit 194 calculates the expected value as 3 by multiplying the probabilities of the choices c1, c2, and c3 by the number of choices 3, and adding them together, as shown in Expression (2).

Further, the display number prediction unit 194 calculates an expected value of the number of choices displayed until any one of the choices is selected in the second pattern (illustrated in FIG. 18) as in Expression (3).

[Expression 3]

$$0.9 \times 3 + 0.05 \times 3 + 0.05 \times 4 = 3.05 \qquad (3)$$

In the case of the second pattern, the display unit 420 displays the choices c1 and c2 and the choice "(N) Other" for instructing the display of the next screen on the first screen. Therefore, the number of choices on the first screen is three. When the user has selected either of the choices c1 and c2, the number of choices displayed by the display unit 420 is three.

The display unit 420 also displays the choice c3 on the second screen. Accordingly, the number of choices on the second screen is one. When the user has selected the choice c3, the number of choices displayed by the display unit 420 is four, which is the total of three choices on the first screen and the one choice on the second screen.

Therefore, the display number prediction unit 194 multiplies each of the probabilities of the choices c1 and c2 by the number of choices 3, multiplies the probability of the choice c3 by the number of choices 4, and then sums the products together to calculate the expected value as 3.05 as in Expression (3).

Further, the display number prediction unit 194 calculates the expected value of the number of choices displayed until any one of the choices is selected in the third pattern (illustrated in FIG. 21) as in Expression (4).

[Expression 4]

$$0.9 \times 2 + 0.05 \times 4 + 0.05 \times 5 = 2.25 \qquad (4)$$

In the case of the third pattern, the display unit 420 displays the choice c1 and the choice "(N) Other" for instructing the display of the next screen on the first screen. That is, the number of choices on the first screen is two. Therefore, when the user selects the choice c1, the number of choices displayed on the display unit 420 is two.

Further, when the choice "(N) Other" is selected on the first screen, the display unit 420 displays the choice c2 and the choice "(N) Other" for instructing the display of the next screen on the second screen. Therefore, the number of choices on the second screen is two. When the user selects the choice c2, the number of choices displayed by the display unit 420 is four, which is the total of the two choices on the first screen and the two choices on the second screen.

Further, when the choice "(N) Other" is selected on the second screen, the display unit 420 displays the choice c3 on the third screen. Therefore, the number of choices on the third screen is one. When the user has selected the choice c3, the number of choices displayed by the display unit 420 is five, which is the total of the two choices on the first screen, the two choices on the second screen, and the one choice on the third screen.

Therefore, the display number prediction unit 194 multiplies the probability of choice c1 by the number of choices 2, the probability of choice c2 by the number of choices 4, and the probability of choice c3 by the number of choices 5, and then sums the products together to calculate the expected value as 2.25 as in Expression (5).

[Expression 5]

$$0.9 \times 2 + 0.05 \times 4 + 0.05 \times 4 = 2.2 \qquad (5)$$

In the case of the fourth pattern, the display unit 420 displays the choice c1 and the choice "(N) Other" for instructing the display of the next screen on the first screen. Therefore, the number of choices on the first screen is two. When the user has selected the choice c1, the number of choices displayed by the display unit 420 is two.

Further, when the choice "(N) Other" is selected on the second screen, the display unit 420 displays the choices c2 and c3 on the second screen. Therefore, the number of choices on the second screen is two. When the user has selected one of the choices c2 and c3, the number of choices displayed by the display unit 420 is four, which is the sum of the two choices on the first screen and the two choices on the second screen.

Therefore, the display number prediction unit 194 multiplies the probability of the choice c1 by the number of choices 2 and each of the probabilities of the choices c2 and c3 by the number of choices 4, and then sums the products together to calculate the expected value as 2.2 as in Expression (5).

Among the first to fourth patterns, the fourth pattern has the smallest expected value regarding the number of displayed choices. Therefore, the display format determination unit 195 determines the pattern for displaying the choices on the display unit 420 as the fourth pattern. The display format determination unit 195 generates the image data of the display screen of the choices on the basis of the fourth pattern, and transmits the image data to the display unit 420 via the answering-side communication unit 110 to display the display screen.

An example of a processing procedure in which the question responding apparatus 100 according to the second example embodiment answers a user query is similar to that described with reference to FIG. 12. However, the path selection unit 191 selects k paths in Step S105. In addition, in Step S106, the choices processing unit 193 causes the user terminal apparatus 400 to display a display screen of a plurality of choices.

Figure 26:
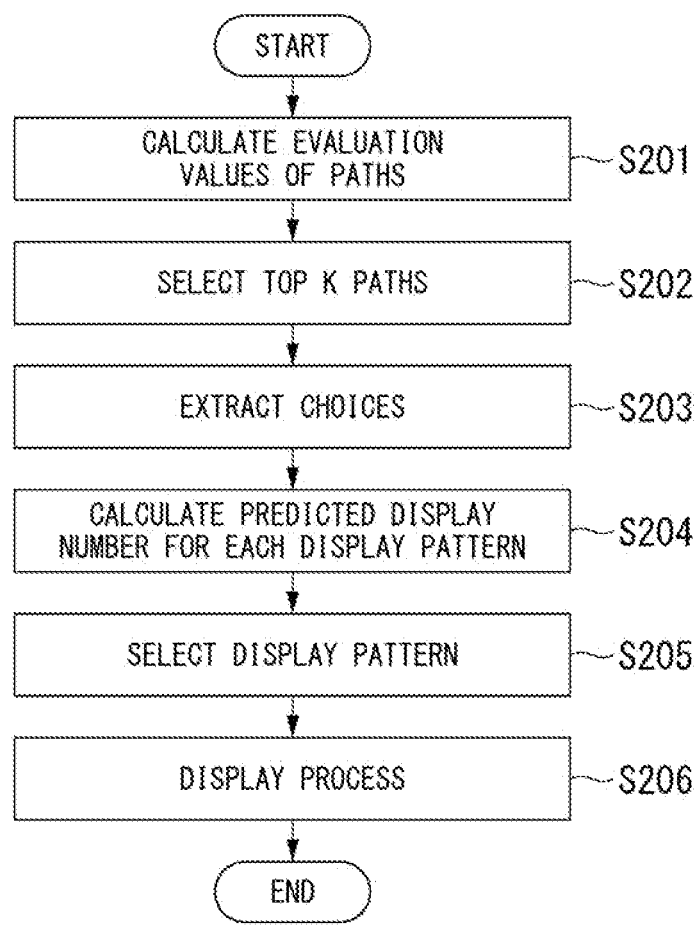
FIG. 26 is a flowchart showing an example of a processing procedure in which the question responding apparatus according to the second example embodiment causes the user terminal apparatus to display choices.

FIG. 26 is a flowchart showing an example of a processing procedure in which the question responding apparatus 100 causes the user terminal apparatus 400 to display choices.

In the process of FIG. 26, the path selection unit 191 determines the evaluation value of each of the paths from the current position node to the answer candidate nodes (Step S201).

Then, the path selection unit 191 selects the top k (where k is a natural number) paths in descending order of evaluation (in descending order of evaluation value) (Step S202). The path selection unit 191 may select paths until the number of choices becomes k.

Next, the choices processing unit 193 extracts the choice nodes included in the path selected by the path selection unit 191 (Step S203).

The display number prediction unit 194 reads out a plurality of display formats (e.g., the patterns described above) of the choices from the answering-side storage unit 170, and calculates, for each of the display formats, a prediction value (e.g., the expected value) of the number of choices displayed by the display unit 420 until the user selects any of the choices (Step S204). The display format determination unit 195 selects the display format with the smallest prediction value (e.g., expected value) (Step S205).

The display format determination unit 195 performs a display process of choices using the selected display format (Step S206). Specifically, the display format determination unit 195 generates the image data of the display screen of the choices on the basis of the selected display format. The display format determination unit 195 causes the display unit 420 of the user terminal apparatus 400 to display the choices by transmitting the generated image data to the user terminal apparatus 400 via the answering-side communication unit 110.

After Step S206, the process of FIG. 26 ends.

FIG. 27 is a diagram showing an example of the interaction between the user and the question responding system 1.

In the example of FIG. 27, the user has input a user query "I want to know my number of vacation days" using the operation input unit 430. In this way, the user can input a user query in a sentence in natural language, so that the user can relatively easily ask various questions to the question responding system 1.

In response to the user query, the question responding system 1 presents the user with three choices of "(1) special vacation", "(2) annual vacation", and "(N) other vacation", and performs an ask-back to receive a selection of any of the choices.

In response to the ask-back, the user has selected "(2) annual vacation". The question responding system 1 can narrow down the types of vacations to the annual vacation on the basis of the selection made by the user.

In the case of annual vacation, the hierarchical structure data shows that the number of days of vacation given depends on the number of years of service. Therefore, the question responding system 1 performs an ask-back to receive a selection of any of the choices by presenting the user with three choices: "(1) less than 5 years", "(2) 5 years or more and less than 15 years", and "(3) 15 years or more".

In response to the ask-back, the user has selected "(2) 5 years or more and less than 15 years".

The question responding system 1 traces the path of the choice of the number of years of service of 5 years or more and less than 15 years among the paths of the hierarchical structure data, and arrives at a node that answers that the number of days of vacation given is 21 days. Then, the question responding system 1 presents the user with an answer that "your number of days of annual vacation is 21".

In the first ask-back, the question responding system 1 determines the order of the choices and adjusts the number of displayed choices by the processing of FIG. 26.

In the second ask-back, presenting the years of service "(1) less than 5 years", "(2) 5 years or more and less than 15 years", and "(3) 15 years or more" in this order is easy to comprehend. Therefore, the question responding system 1 displays these choices in this order without rearranging based on the evaluation values of the paths. However, the question responding system 1 may determine the order of the choices and adjust the number of displayed choices by the processing of FIG. 26 even for the choices in the second ask-back.

As described above, when the path selection unit 191 selects a plurality of paths and the user's response indicates that a node included in any of the selected paths has been selected, the path selection unit 191 sets the selected node as the current position node and reselects a path.

In this way, by the path selection unit 191 selecting a plurality of paths, it is expected that the number of times that the path selection unit 191 reselects a path will be fewer than in the case in which the path selection unit 191 selects one path, and, in this respect, it is expected that the question responding apparatus 100 can efficiently perform the process of answering the user's question.

In addition, the path selection unit 191 calculates an evaluation value of the possibility of reaching a node indicating the answer for each of the paths other than the paths excluded in accordance with the user's response, among the paths from the current position node to the matching nodes. The higher the evaluation of the path including a node indicated by the choice, the higher the preference given to that choice to be presented to the user by the choices processing unit 186.

In this way, by the choices processing unit 186 preferentially presenting to the user the choice indicated by the node included in a highly evaluated path, it is expected that the user selects the choice presented at a relatively early stage. Accordingly, with the question responding apparatus 100, it is expected that the number of choices presented to the user will be relatively small, and in this respect, the burden on the user is expected to be relatively small.

In addition, the display number prediction unit 194 calculates, for each of the plurality of display formats for displaying choices, a prediction value indicating a prediction of the number of display items to be displayed until any of the choices is selected, on the basis of an index value indicating, for each choice, the magnitude of the possibility of that choice being selected. The display format determination unit 195 selects one of the display formats on the basis of the calculated prediction value.

The display format determination unit 195 can select a display format in which the number of display items predicted to be displayed until one of the choices is selected is relatively small. In this way, with the question responding apparatus 100, the processing of the question responding apparatus 100 can be relatively small when presenting the choices to the user and receiving the selection.

In addition, in the question responding apparatus 100, the number of display items to be confirmed by the user is relatively small, and so in this respect, the burden of processing for selecting a choice by the user can be reduced.

Also, each of the display items indicates one of the choices or the display of the next display screen.

Thereby, in the question responding apparatus 100, it is possible to achieve a reduction in the number of display items that are presented to the user by the relatively simple process of distributing and arranging the choices over a plurality of display screens and then switching the display screens until the user selects one of the choices.

Also, the display number prediction unit 194 calculates an expected value of the number of display items displayed until any choice is selected as a prediction value, using the probability that a choice is selected as an index value.

In this way, by the display number prediction unit 194 using the probability and the expected value, the concept of the processing performed by the display number prediction unit 194 becomes clearer. In this respect, with the question responding apparatus 100, it is relatively easy to ascertain the process performed by the display number prediction unit 194.

The display number prediction unit 194 also calculates a prediction value for each of a plurality of predetermined display formats. The display format determination unit 195 selects the display format with the smallest prediction value.

In this way, by the question responding apparatus 100 using a predetermined display format, it is possible to present a choice to the user more quickly than when the display format is generated when presenting the choice to the user, and the processing load of the question responding apparatus 100 is reduced.

It should be noted that the user interface used by the question responding system 1 is not limited to the screen display. For example, the question responding system 1 may use a voice interface such as a voice interaction agent or a combination of voice guidance and key operation in addition to or in place of presenting choices to the user and user answers by a screen display and key operation. When presenting choices to the user by voice, it is expected that the number of choices presented will be relatively small by preferentially presenting choices that the user is likely to select.

In general, it is considered that voice notification to the user takes longer than notification by screen display. When the question responding system 1 presents choices to the user by voice, the number of choices presented is relatively small, so it is expected that an example advantage that the time required can be further reduced is obtained as compared with the case in which the choices are presented by a screen display.

Next, the configuration of an example embodiment of the present invention will be described with reference to FIG. 28.

FIG. 28 is a diagram showing an example of the configuration of the question responding apparatus according to an example embodiment of the present invention. The question responding apparatus 10 shown in FIG. 28 is provided with a type determination unit 11, a path selection unit 12, and a choices processing unit 13.

With this configuration, the type determination unit 11 determines the type of answer to a question on the basis of the question from the user. The path selection unit 12 selects one of the paths from the current position node selected from the nodes in the hierarchical structure of information to the matching nodes that match the type of answer. The choices processing unit 13 presents information indicating the nodes included in the selected path to the user as choices.

In this way, it is possible to preferentially present to the user a choice capable of reaching the matching node or suppress the presentation of choices not capable of reaching the matching node by the path selection unit 12 selecting a path capable of reaching the matching node. That is, the path selection unit 12 can preferentially present to the user a choice with which an answer may be obtained. Alternatively, the path selection unit 12 can present to the user only the choices with which the answer may be obtained.

Thereby, it is expected that the number of times that the question responding apparatus re-presents choices will be relatively few until the user selects one of the choices. In this respect, with the question responding apparatus 10, the processing of the question responding apparatus 10 is relatively small when performing an ask-back to the user and extracting the answer from the document.

Moreover, with the question responding apparatus 10, due to the number of times that the question responding apparatus 10 re-presents choices until the user selects any one of the choices being relatively few, it is expected that the time until the answer to the question is obtained is relatively short.

Also, the user can determine whether or not to select choices, giving priority to the choices with which an answer may be obtained. Alternatively, the user can determine whether or not to make a selection only from choices with a possibility of obtaining an answer, or to select any of the choices. In this respect, it is expected that the possibility that the user makes a determination regarding selection of a choice is relatively small, and the burden on the user is relatively small.

It should be noted that the processing of each unit may be performed by recording a program for realizing all or some of the functions of the answering-side control unit 180 according to the first example embodiment or the answering-side control unit 180 according to the second example embodiment in a computer-readable recording medium, reading the program recorded on this recording medium into a computer system, and executing the program. The "computer system" mentioned here includes an operating system (OS) and hardware such as peripheral devices.

A "computer-readable recording medium" refers to a portable medium such as a flexible disk, a magneto-optical disk, a ROM, a CD-ROM, or a storage apparatus such as a hard disk built in a computer system. Further, the above-mentioned program may be one for realizing some of the above-mentioned functions, and may be one for realizing the above-mentioned functions in combination with a program already recorded in the computer system.

Although example embodiments of the present invention have been described in detail above with reference to the drawings, the specific configuration is not limited to these example embodiments, and design changes and the like within a scope not departing from the gist of the present invention are included.

INDUSTRIAL APPLICABILITY

The example embodiments of the present invention may be applied to a question responding apparatus, a question responding method, and a recording medium.

DESCRIPTION OF THE REFERENCE SYMBOLS

1 Question responding system
100 Question responding apparatus
110 Answering-side communication unit
170 Answering-side storage unit
180 Answering-side control unit
181 Hierarchically structured data generation unit
182 User query processing unit
183 Topic processing unit
184 Type determination unit
185 Path selection unit
186 Choices processing unit
187 Information search unit
200 Document data management apparatus
300 Auxiliary information providing apparatus
400 User terminal apparatus
410 Terminal-side communication unit
420 Display unit
430 Operation input unit
470 Terminal-side storage unit
480 Terminal-side control unit
900 Communication network

What is claimed is:

1. A question responding apparatus comprising:
a memory configured to store instructions; and
a processor configured to execute the instructions to:
determine, based on a question from a user, a unit in which an answer to the question is provided, as a type of the answer;
select, by an inference engine, a user query node among nodes in a hierarchical structure of information as a current position node in an initial setting, the user query node selected based on similarity to the question from the user;
select at least one path among paths from the user query node selected as the current position node to matching nodes that indicate the unit used as the type of the answer;
display, on a display, the nodes in the hierarchical structure that are included in the selected at least one path, to present information from which the user is to make a choice to provide the answer to the question; and
receive input of a node selected by the user from the displayed nodes, by which to provide the answer to the question.

2. The question responding apparatus according to claim 1, wherein the processor is configured to execute the instructions to further reselect the at least one path in accordance with a response from the user to the presentation of the information.

3. The question responding apparatus according to claim 2, wherein the processor is configured to execute the instructions to, when the response from the user indicates non-selection of any node included in the selected at least one path, select a different path.

4. The question responding apparatus according to claim 2, wherein the processor is configured to execute the instructions to select a predetermined number of paths as the at least one path, and when the response from the user indicates selection of a node included in any of the predetermined number of paths, set the selected node as the current position node and reselect the at least one path.

5. The question responding apparatus according to claim 2, wherein the processor is configured to execute the instructions to:
calculate an evaluation value of a possibility of reaching a correct answer node indicating a correct answer for each of the at least one path other than a path excluded in accordance with the response from the user among the at least one path from the current position node to the matching nodes; and
preferentially display the nodes to present the information, in order of the evaluation value of the at least one path.

6. The question responding apparatus according to claim 1, wherein the processor is configured to execute the instructions to:
search for information for reselecting the at least one path; and suppress presentation of display of the nodes when the information for reselecting the at least one path has been acquired.

7. A question responding method comprising:

determining, by a processor and based on a question from a user, a unit in which an answer to the question is provided, as a type of the answer;

selecting, by the processor using an inference engine, a user query node among nodes in a hierarchical structure of information as a current position node in an initial setting, the user query node selected based on similarity to the question from the user;

setting, by the processor, at least one path among paths from the user query node selected as the current position node to matching nodes that indicate the unit used as the type of the answer;

displaying, by the processor and on a display, the nodes in the hierarchical structure that are included in the selected at least one path, to present information from which the user is to make a choice to provide the answer to the question; and receiving, by the processor, input of a node selected by the user from the displayed nodes, by which to provide the answer to the question.

8. A non-transitory computer-readable recording medium storing a program executable by a computer to perform:

determining, based on a question from a user, a unit in which an answer to the question is provided, as a type of the answer;

selecting, using an inference engine, a user query node among nodes in a hierarchical structure of information as a current position node in an initial setting, the user query node selected based on similarity to the question from the user;

setting at least one path among paths from the user query node selected as the current position node to matching nodes that indicate the unit used as the type of the answer;

displaying, on a display, the nodes in the hierarchical structure that are included in the selected at least one path, to present information from which the user is to make a choice to provide the answer to the question; and receiving input of a node selected by the user from the displayed nodes, by which to provide the answer to the question.

* * * * *